US012397562B2

(12) United States Patent
Hayashi et al.

(10) Patent No.: US 12,397,562 B2
(45) Date of Patent: Aug. 26, 2025

(54) LIQUID DROPLET EJECTING APPARATUS

(71) Applicant: BROTHER KOGYO KABUSHIKI KAISHA, Nagoya (JP)

(72) Inventors: Masahiro Hayashi, Anjo (JP); Takafumi Nakase, Nagoya (JP); Ryuji Horata, Gamagori (JP); Nobumasa Tanaka, Nagoya (JP); Kenta Horade, Tokai (JP); Zenichiro Sasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 26 days.

(21) Appl. No.: 18/449,042

(22) Filed: Aug. 14, 2023

(65) Prior Publication Data

US 2024/0059076 A1 Feb. 22, 2024

(30) Foreign Application Priority Data

Aug. 18, 2022 (JP) ................................ 2022-130724

(51) Int. Cl.
*B41J 2/21* (2006.01)
*B41J 2/11* (2006.01)
*B41J 2/165* (2006.01)
*B41J 2/175* (2006.01)

(52) U.S. Cl.
CPC ............... *B41J 2/2142* (2013.01); *B41J 2/11* (2013.01); *B41J 2/16505* (2013.01); *B41J 2/16526* (2013.01); *B41J 2/17526* (2013.01); *B41J 2/2139* (2013.01)

(58) Field of Classification Search
CPC ........ B41J 2/2142; B41J 2/11; B41J 2/16505; B41J 2/16526; B41J 2/17526; B41J 2/2139; B41J 2/16508; B41J 2/16523; B41J 2/16579
See application file for complete search history.

(56) References Cited

U.S. PATENT DOCUMENTS

2007/0139461 A1 6/2007 Izuo
2009/0213168 A1 * 8/2009 Ito ........................ B41J 2/16517 347/19
2011/0181652 A1 7/2011 Komatsu
2014/0300657 A1 10/2014 Ike

FOREIGN PATENT DOCUMENTS

JP 2007-152889 A 6/2007
JP 2011-152689 A 8/2011
JP 2014-200982 A 10/2014

* cited by examiner

*Primary Examiner* — Justin Seo
(74) *Attorney, Agent, or Firm* — Scully, Scott, Murphy & Presser, PC

(57) ABSTRACT

There is provided a liquid ejecting apparatus including: a head having a nozzle; a signal outputting part having an electrode and configured to output a signal indicating a magnitude of an electric change in the electrode; and a controller. The controller is configured to execute a determination as to whether or not the nozzle is normal based on the signal output from the signal outputting part in a case that the controller drives the head so as to eject a liquid droplet from the nozzle toward the electrode. The controller is configured to determine that the nozzle is normal in a case that the magnitude of the electric change is within a predetermined normal range, and to determine that the nozzle has a first abnormality in a case that the magnitude of the electric change is greater than the normal range.

16 Claims, 13 Drawing Sheets

| H | H < H3a | H3a ≤ H < H2a | H2a ≤ H < H1a | H ≥ H1a |
|---|---|---|---|---|
| RESULT OF DETERMINATION | THIRD ABNORMALITY | SECOND ABNORMALITY | NORMAL | FIRST ABNORMALITY |

| H | H < H3a | H3a≤ H < H2a | H2a ≤ H < H1a | H ≥ H1a |
|---|---|---|---|---|
| RESULT OF DETERMINATION | THIRD ABNORMALITY | SECOND ABNORMALITY | NORMAL | FIRST ABNORMALITY |

| H | H < H3b | H3b≤ H < H2b | H2b ≤ H < H1b | H ≥ H1b |
|---|---|---|---|---|
| RESULT OF DETERMINATION | THIRD ABNORMALITY | SECOND ABNORMALITY | NORMAL | FIRST ABNORMALITY |

| H | H < H3c | H3c≤ H < H2c | H2c ≤ H < H1c | H ≥ H1c |
|---|---|---|---|---|
| RESULT OF DETERMINATION | THIRD ABNORMALITY | SECOND ABNORMALITY | NORMAL | FIRST ABNORMALITY |

| Hx | Hx < Hx3 | Hx3 ≤ Hx < Hx2 | Hx2 ≤ Hx < Hx1 | Hx ≥ Hx1 |
|---|---|---|---|---|
| RESULT OF DETERMINATION | THIRD ABNORMALITY | SECOND ABNORMALITY | NORMAL | FIRST ABNORMALITY |

| Hy | Hy < Hy3 | Hy3 ≤ Hy < Hy2 | Hy2 ≤ Hy < Hy1 | Hy ≥ Hy1 |
|---|---|---|---|---|
| RESULT OF DETERMINATION | THIRD ABNORMALITY | SECOND ABNORMALITY | NORMAL | FIRST ABNORMALITY |

LIQUID DROPLET EJECTING APPARATUS

REFERENCE TO RELATED APPLICATIONS

This application claims priority from Japanese Patent Application No. 2022-130724 filed on Aug. 18, 2022. The entire content of the priority application is incorporated herein by reference.

BACKGROUND ART

As an example of the liquid droplet ejecting apparatus configured to eject a liquid droplet from a nozzle, for example, there is a publicly known printing apparatus which eject an ink droplet of an ink from a nozzle so as to perform printing. In a certain publicly known printer apparatus, in a state that an electrode for detection (detection electrode) is made to have a predetermined potential by a high voltage power source unit and that a nozzle plate and the detection electrode are arranged with a predetermined spacing distance therebetween, the ink droplet is ejected from the nozzle. Further, in this situation, in a case that a potential difference which is a difference between a maximum voltage and a minimum voltage in a voltage signal output from an amplifier connected to the detection electrode is not less than a first threshold value, it is determined that the ink droplet is ejected normally. On the other hand, in a case that the potential difference is smaller than a second threshold value, it is determined that the ink droplet is not ejected and that any clog-up of the nozzle occurs. Further, in a case that the potential difference is lower than the first threshold value and is not less than the second threshold value, it is determined that an unstable ejecting state is present.

DESCRIPTION

In the above-described publicly known printing apparatus, it is always determined that the ink droplet is ejected normally in the case that the potential difference is not less than the first threshold value. In view of this, the inventors of the present disclosure arrived at that also in such a case that the head is caused to perform an inspecting driving of ejecting the liquid droplet from the nozzle toward the electrode and that an electric change in the electrode is great, for example, that the above-described potential difference is not less than the first threshold value, any abnormality is present in the nozzle, in some cases, and arrived at the present disclosure.

An object of the present disclosure is to provide a liquid droplet ejecting apparatus which contributes to a more correct determination as to whether or not any abnormality is present in the ejection of the liquid droplet in the nozzle.

According to an aspect of the present disclosure, there is provided a liquid droplet ejecting apparatus including: a head including a nozzle and configured to perform ejection of a liquid droplet from the nozzle; a signal outputting part including an electrode and configured to output a signal indicating a magnitude of an electric change in the electrode; and a controller. The controller is configured to execute a determination as to whether or not the nozzle is normal based on the signal output from the signal outputting part in a case that the controller drives the head so as to eject the liquid droplet from the nozzle toward the electrode. In a case that the controller executes the determination as to whether or not the nozzle is normal, the controller is configured to: determine that the nozzle is normal in a case that the magnitude of the electric change indicated by the signal output from the signal outputting part is within a normal range, and determine that the nozzle has a first abnormality in a case that the magnitude of the electric change indicated by the signal output from the signal outputting part is greater than the normal range.

Further, according to another aspect of the present disclosure, there is provided a liquid droplet ejecting apparatus including: a nozzle configured to eject a liquid droplet; a signal outputting part configured to output a signal in accordance with a result of an inspecting driving of inspecting as to whether or not the nozzle has an abnormality; and a controller. The controller is configured to: determine that the nozzle is normal in a case that a value of the signal output from the signal outputting part is within a normal range; determine that the nozzle has a first abnormality in a case that the value of the signal is greater than the normal range; and determine that the nozzle has a second abnormality, which is different from the first abnormality, in a case that the value of the signal is smaller than the normal range.

In the case that the magnitude of the electric change indicated by the signal output from the signal outputting part is greater than the normal range, the controller determines that the nozzle has the first abnormality (the first abnormality is present in the nozzle). With this, it is possible to determine as to whether or not the abnormality is present in the nozzle correctly, as compared with the case of determining that the nozzle is normal always in a case that the electric change indicated by the signal output from the signal outputting part is large to be not less than a predetermined extent (value).

Further, in the present disclosure, it is possible to determine as to whether or not the nozzle is normal, whether or not the nozzle has the first abnormality and whether or not the nozzle has the second abnormality, based on, respectively, that the value of the signal output from the signal outputting part is within the normal range, that the value of the signal is greater than the normal range and that the value of the signal is smaller than the normal range.

Figures 5A, 5B, 5C, 5D:
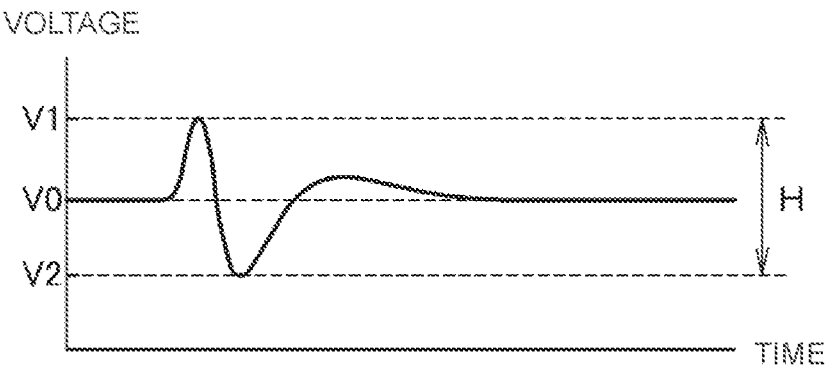

FIG. 5A is a view for explaining a signal output from the signal processing circuit in a case that an inspecting driving is performed; FIG. 5B is a view for explaining a criterion for determining the absence or presence of an abnormality and a kind of the abnormality regarding an ejection of a large droplet; FIG. 5C is a view for explaining a criterion for determining the absence or presence of an abnormality and a kind of the abnormality regarding an ejection of a medium droplet; and FIG. 5D is a view for explaining a criterion for determining the absence or presence of an abnormality and a kind of the abnormality regarding an ejection of a small droplet.

Figure 4:
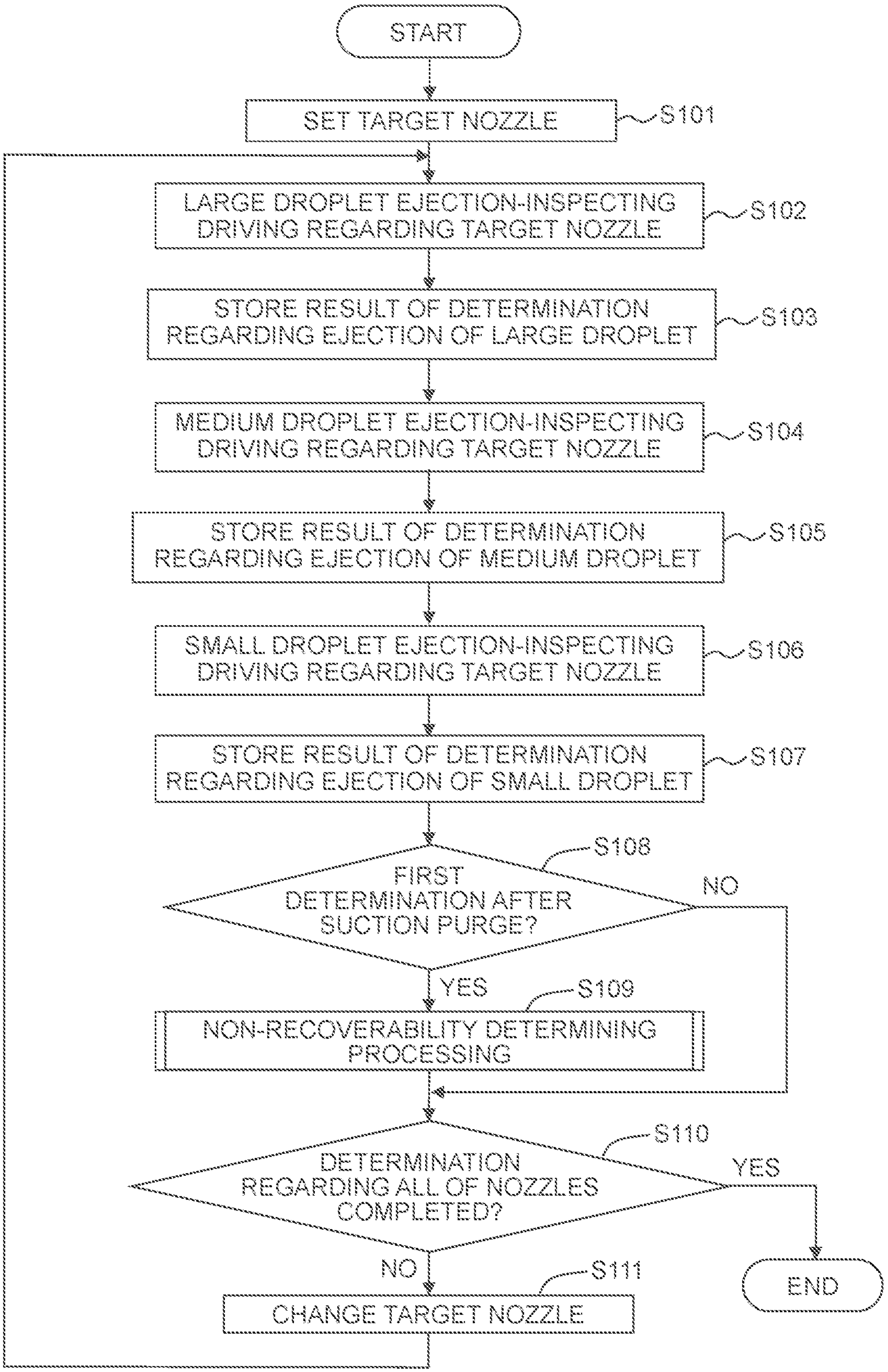
FIG. 4 is a flow chart indicating a flow of a processing of determining as to whether or not a nozzle is normal.
Figure 6A:
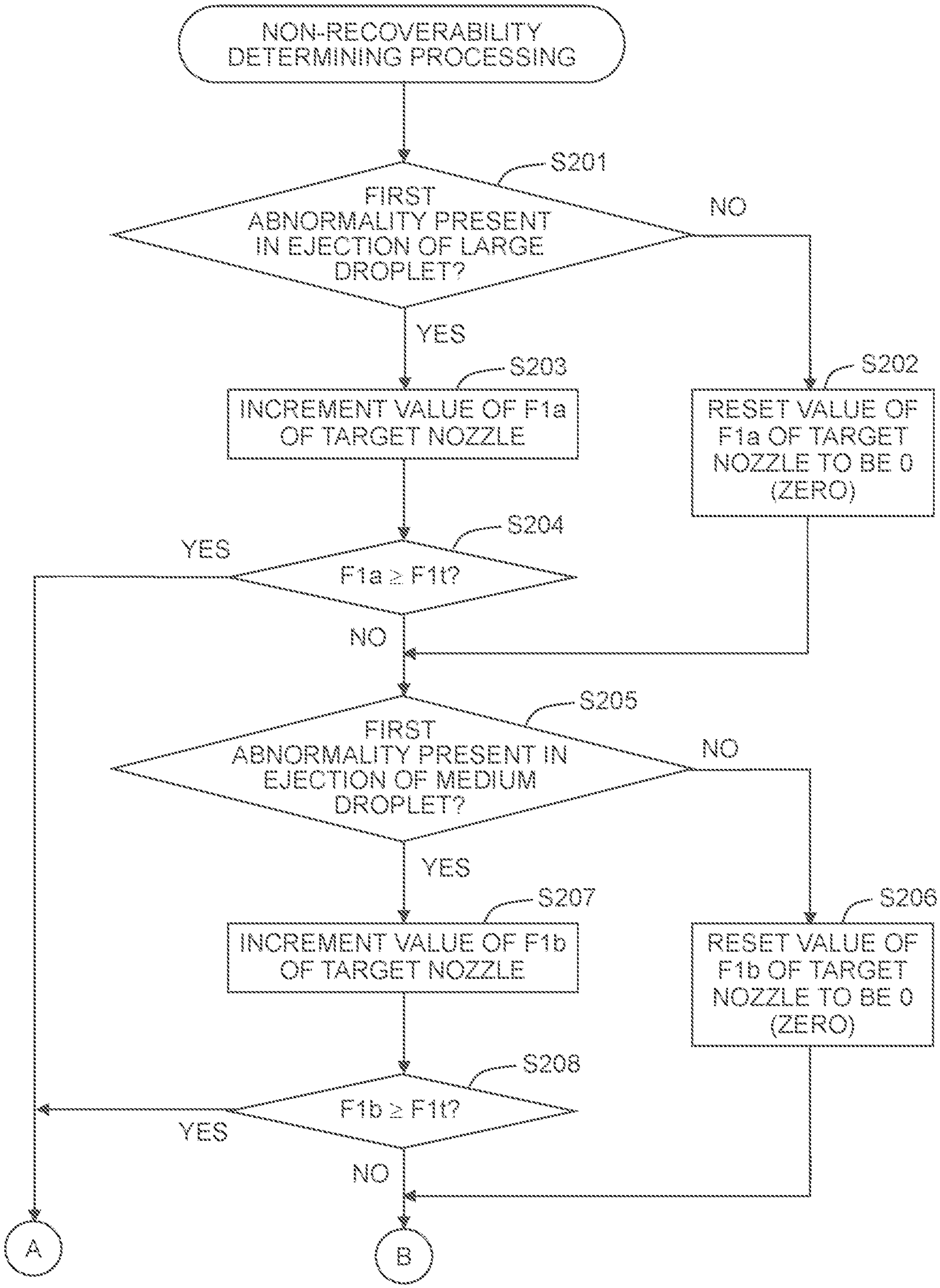
Figure 6B:
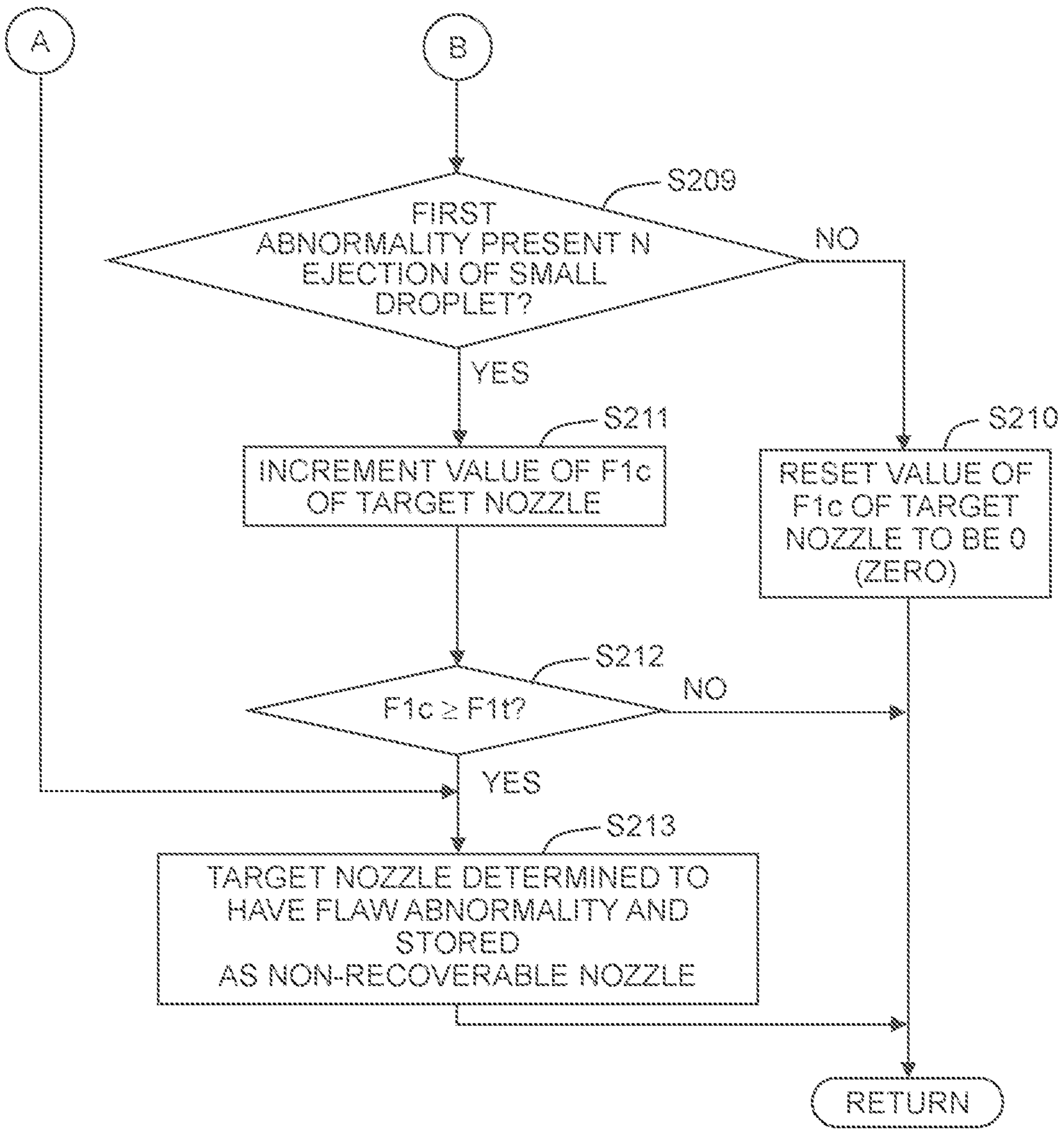

FIGS. 6A and 6B depict a flow chart indicating a flow of a non-recoverability determining processing of FIG. 4.

Figure 7:
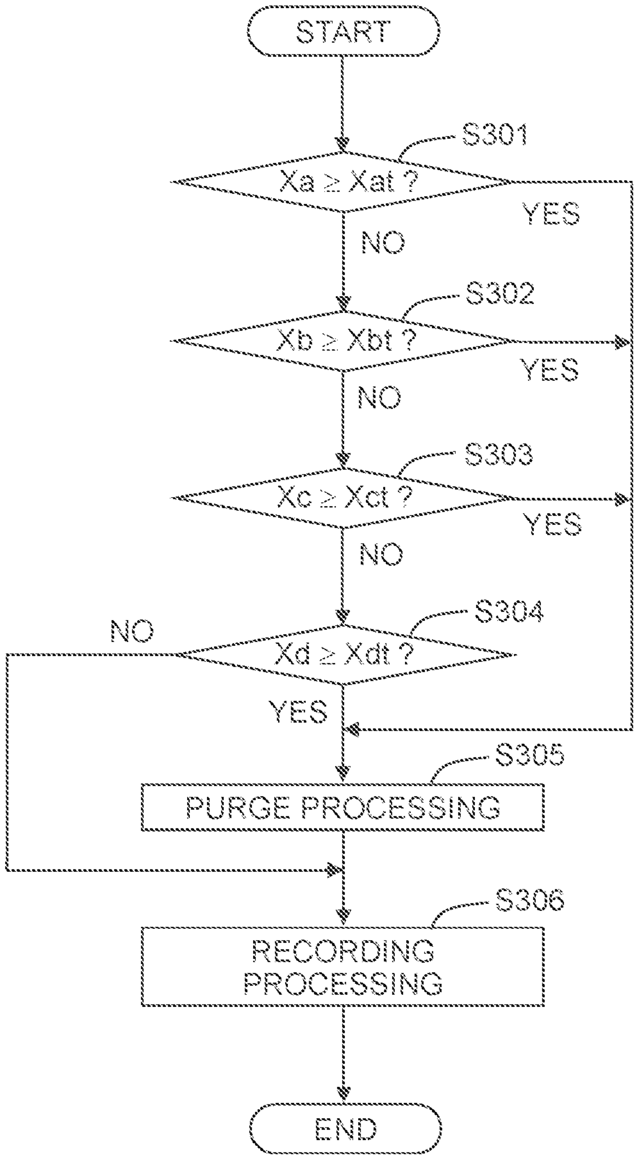

FIG. 7 is a flow chart indicating a flow of a processing during recording.

Figure 8:
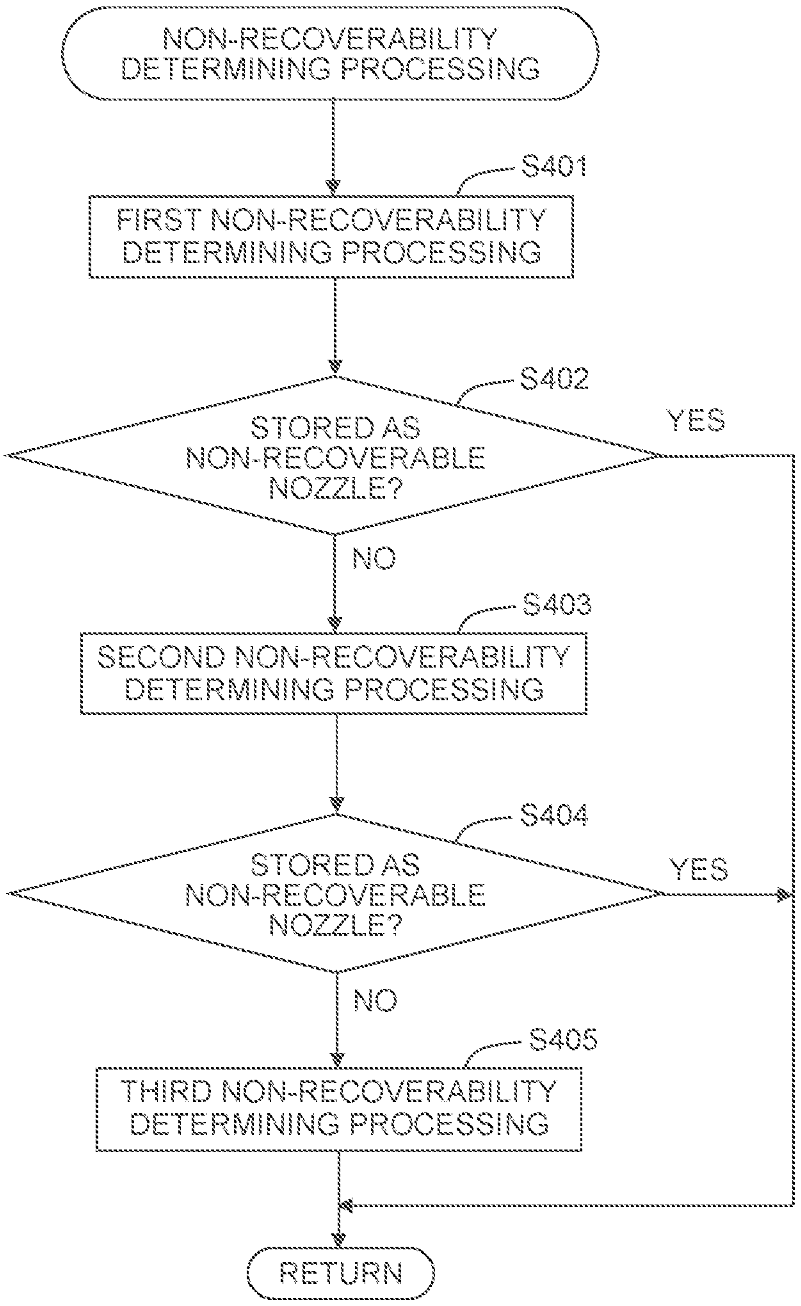

FIG. 8 is a flow chart indicating a flow of the non-recoverability determining processing of performing storing of a non-recoverable nozzle based on a number (quantity) of nozzle(s) each having a first abnormality, a second abnormality or a third abnormality.

Figure 9A:
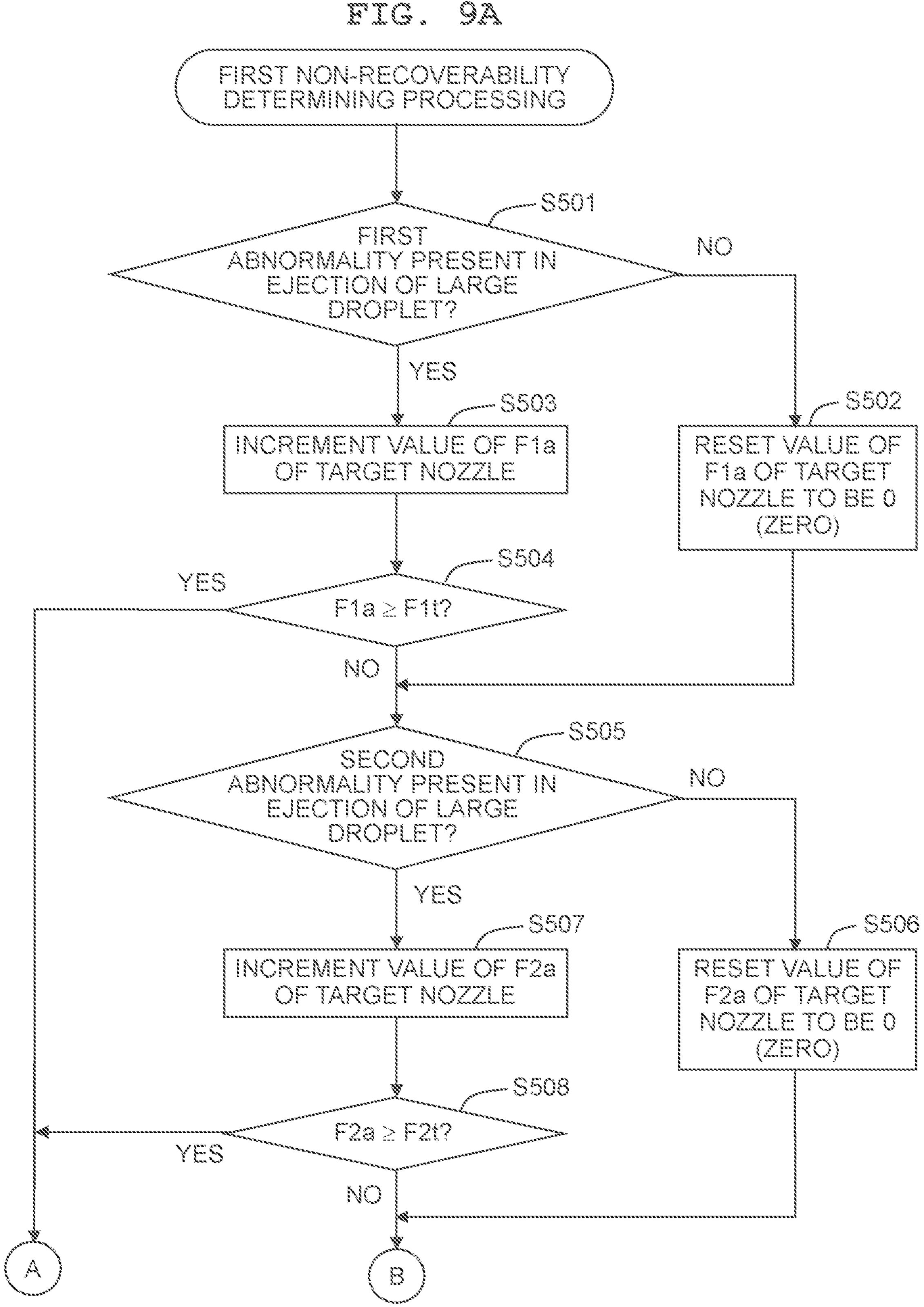
Figure 9B:
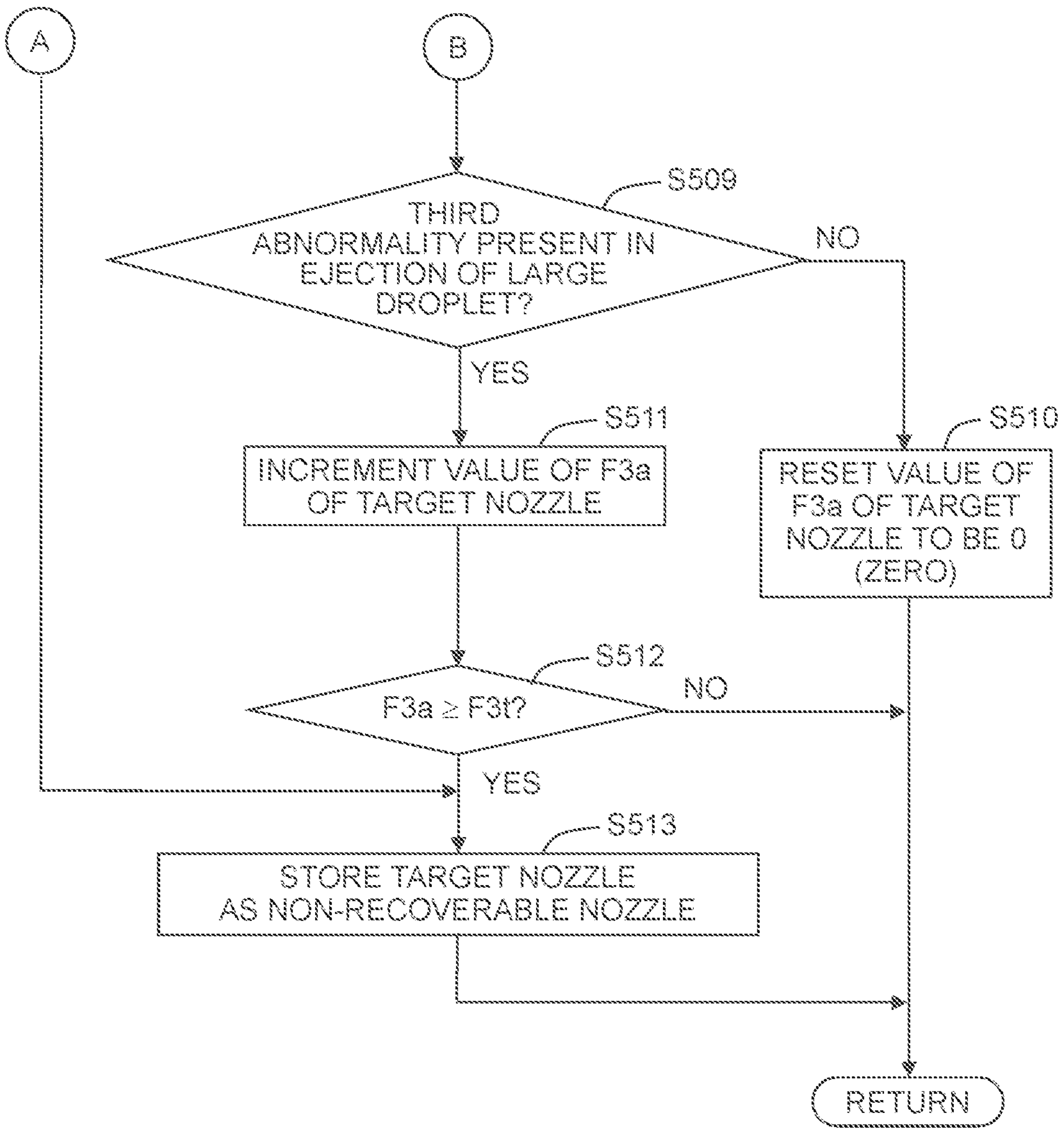

FIGS. 9A and 9B depict a flow chart indicating a flow of a first non-recoverability determining processing of FIG. 8.

Figure 10A:
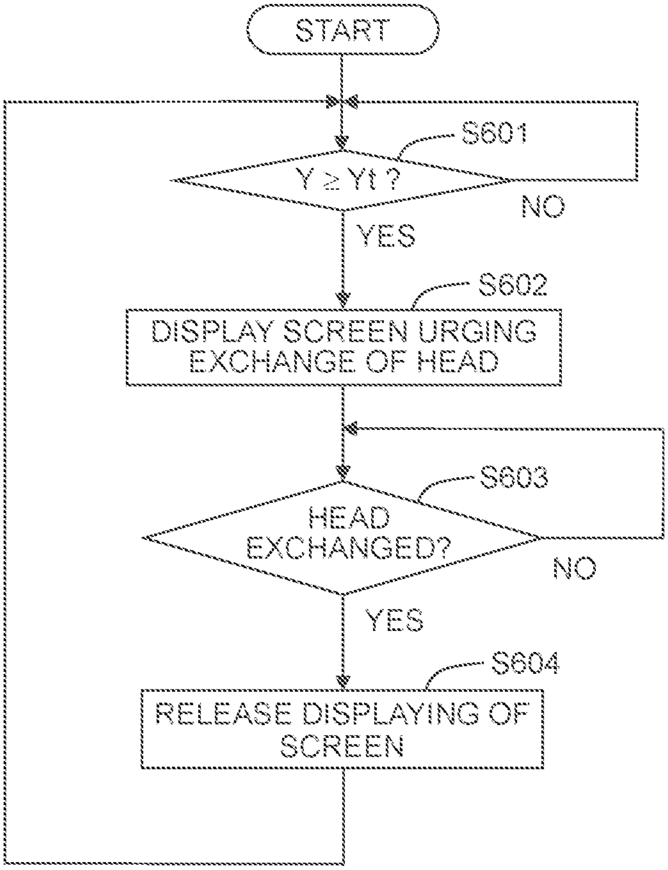
Figure 10B:
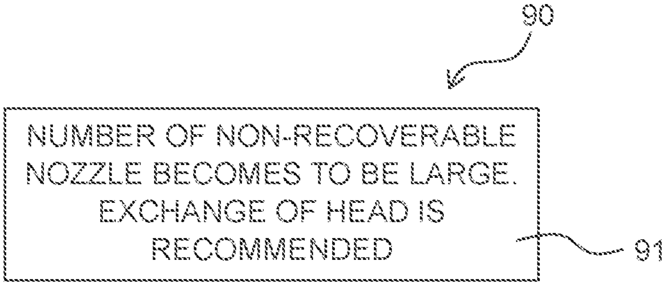

FIG. 10A is a flow chart indicating a flow of a processing for urging exchange of an ink-jet head in accordance with a number (quantity) of the non-recoverable nozzle(s); and FIG. 10B is a view for explaining a screen (image) urging the exchange of the ink-jet head displayed by the processing of FIG. 10A.

Figures 11A, 11B, 11C:
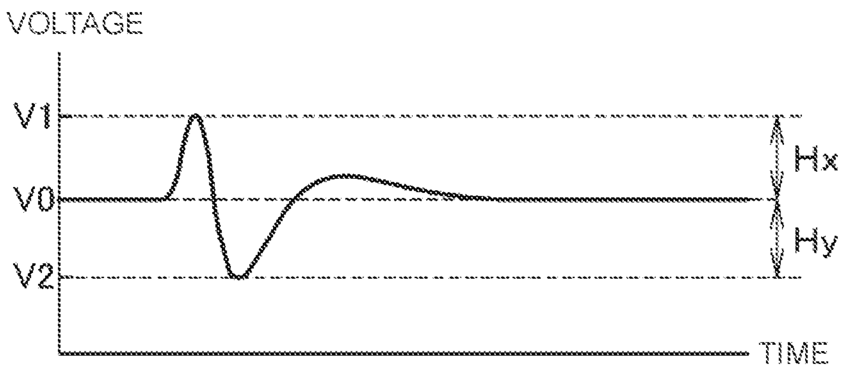

FIG. 11A is a view for explaining a voltage difference Hx and a voltage difference Hy; FIG. 11B is a view for explaining a criterion for determining the absence or presence of an abnormality and a kind of the abnormality based on the voltage difference Hx; and FIG. 11C is a view for explaining a criterion for determining the absence or presence of an abnormality and a kind of the abnormality based on the voltage difference Hy.

In the following, an embodiment of the present disclosure will be explained.

<Overall Configuration of Ink-Jet Printer 1>

Figure 1:
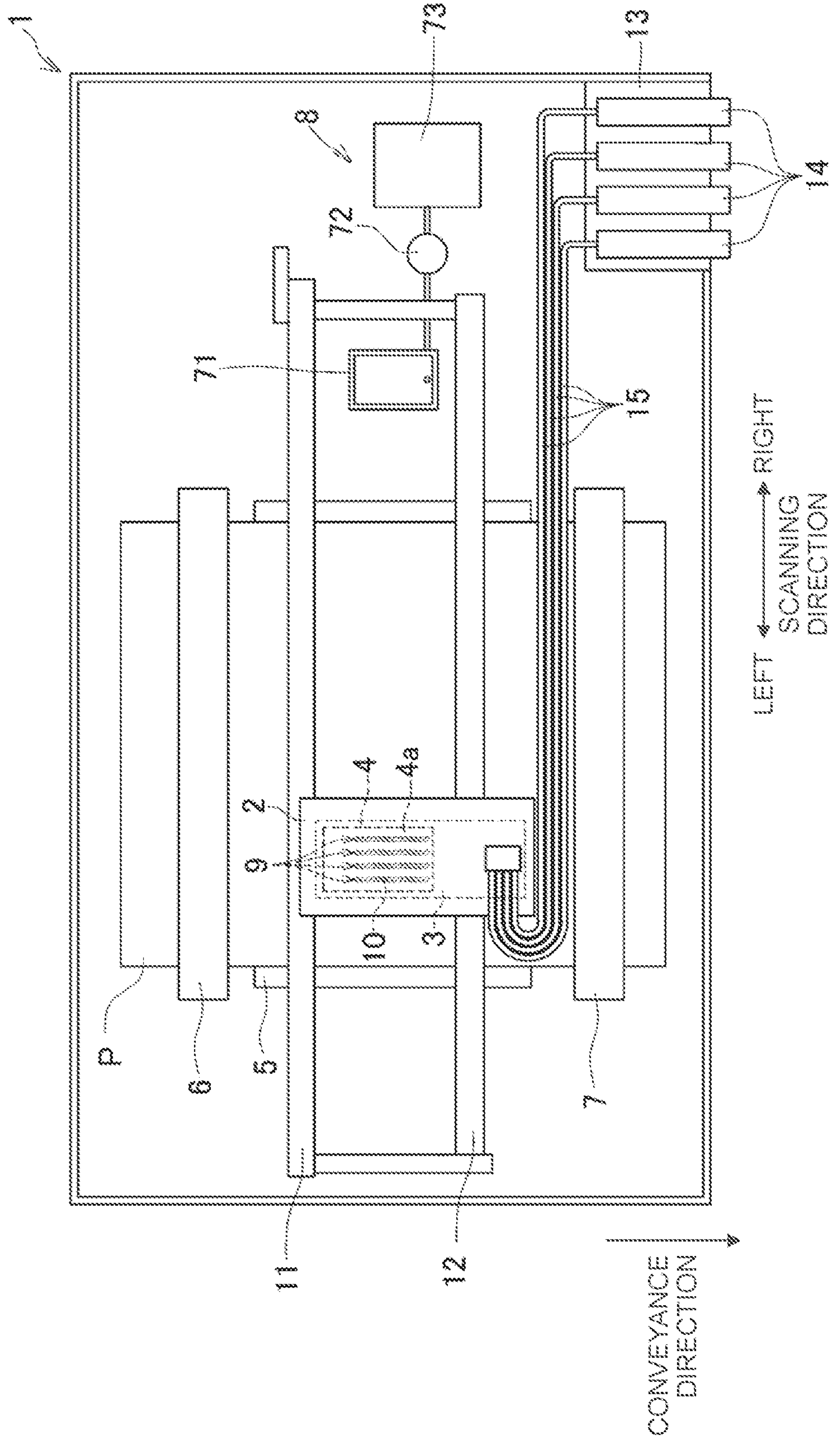
FIG. 1 is a view depicting the schematic configuration of a printer.

As depicted in FIG. 1, a printer 1 according to the present embodiment (corresponding to a "recording apparatus" of the present disclosure) is mainly provided with a carriage 2, a sub tank 3, an ink-jet head 4 (corresponding to a "head" of the present disclosure), a platen 5, conveying rollers 6 and 7 and a maintenance unit 8.

The carriage 2 is supported by two guide rails 11 and 12 extending in a scanning direction. Note that in the following, the explanation will be given, with the right side and the left side in the scanning direction are defined as depicted in FIG. 1. The carriage 2 is connected to a carriage motor 86 (see FIG. 3) via a non-illustrate belt, etc. In a case that the carriage motor 86 is driven, the carriage 2 moves in the scanning direction along the guide rails 11 and 12.

The sub tank 3 is carried on the carriage 2. Here, the printer 1 is provided with a cartridge holder 13. Four ink cartridges 14 are detachably installed in the cartridge holder 13. The four ink cartridges 14 installed in the cartridge holder 13 are arranged side by side in the scanning direction, and store, respectively, a black ink, a yellow ink, a cyan ink and a magenta ink (each of which corresponds to a "liquid" of the present disclosure), in this order from an ink cartridge 14, of the four ink cartridges 14, which is positioned on the rightmost side in the scanning direction.

The ink-jet head 4 is installed in the carriage 2, and is connected to a lower end part of the sub tank 3. Further, the ink-jet head 4 ejects ink droplets (droplets of an ink; corresponding to a "liquid droplet" of the present disclosure) from a plurality of nozzles 10 formed in a nozzle surface 4*a* which is the lower surface of the ink-jet head 4. To provide a more specific explanation, the plurality of nozzles 10 form four nozzle rows (nozzle arrays) 9 which are arranged side by side in the scanning direction in the nozzle surface 4*a*. In each of the nozzle rows 9, the nozzles 10 are aligned in a conveying direction orthogonal to the scanning direction. The positions in the conveying direction of the nozzles 10 are same among the four nozzles rows 9. The black, yellow, cyan, and magenta inks are supplied, from the sub tank 3, to the plurality of nozzles 10, in an order from nozzles 10, of the plurality of nozzles 10, which forms the nozzle row 9 which is included in the four nozzle rows 9 and which is located on the rightmost side in the scanning direction. With this, ink droplets of black, ink droplets of yellow, ink droplets of cyan and ink droplets of magenta are ejected, respectively, from the four nozzle rows 9 in this order from the nozzle row 9 which is included in the four nozzle rows 9 and which is located on the rightmost side in the scanning direction.

Further, the ink-jet head 4 has a plurality of driving elements 20 (see FIG. 3) each of which is provided, independently, with respect to one of the plurality of nozzles 10. Each of the plurality of driving elements 20 applies an ejecting energy to the ink in one of the plurality of nozzles 10 corresponding thereto. Each of the plurality of driving elements 20 is, for example, a piezoelectric actuator configured to apply a pressure to the ink inside a non-illustrated pressure chamber communicating with one of the plurality of nozzles 10. The plurality of driving elements 20 are connected to a driver IC 89 (see FIG. 3). The driver IC 89 outputs a driving signal to each of the plurality of driving elements 20 to thereby apply a predetermined driving voltage to each of the plurality of driving elements 20, thereby driving each of the plurality of driving elements 20. In a case that each of the plurality of driving elements 20 is driven, an ink droplet is ejected from one of the plurality of nozzles 10 corresponding thereto.

Furthermore, in the present embodiment, the driver IC 89 outputs three kinds of driving signals to each of the plurality of driving elements 20, thereby making it possible to eject, respectively, three kinds of ink droplets which are a large droplet, a medium droplet and a small droplets from one of the plurality of nozzles 10 corresponding to each of the plurality of driving elements 20. The three kinds of driving signals are, for example, pulse signals of which pulse widths, pulse numbers (quantities of pulse), etc., are mutually different. The large droplet is an ink droplet ejected so as to form a large dot on a recording paper sheet (recording sheet, recording paper) P. The medium droplet is an ink droplet ejected so as to form a medium dot which is smaller than the large dot on the recording paper sheet P. The small droplet is an ink droplet ejected so as to form a small dot which is smaller than the medium dot on the recording paper sheet P. Here, the medium dot has an amount of the ink (ink amount) which is required to form the medium dot and which is smaller than an ink amount required to form the large dot. Further, the small dot has an ink amount which is required to form the small dot and which is smaller than the ink amount required to form the medium dot. Furthermore, a difference between the ink amount required for forming the large dot and the ink amount required for forming the medium dot is smaller than a difference between the ink amount required for forming the medium dot and the ink amount required for forming the small dot.

The platen 5 is arranged at a location below the ink-jet head 4, and faces (is opposite to) the plurality of nozzles 10. The platen 5 extends over the entire length of the recording paper sheet P in the scanning direction, and supports the recording paper sheet P from therebelow. The conveying roller 6 is arranged on the upstream side in the conveying direction with respect to the ink-jet head 4 and the platen 5. The conveying roller 7 is arranged on the downstream side in the conveying direction with respect to the ink-jet head 4 and the platen 5. The conveying rollers 6 and 7 are connected to a conveying motor 87 (see FIG. 3) via a non-illustrated gear, etc. In a case that the conveying motor 87 is driven, the conveying rollers 6 and 7 are rotated to thereby convey the recording paper sheet P in the conveying direction.

The maintenance unit 8 is provided with a cap 71, a suction pump 72 and a waste liquid tank 73. The cap 71 is arranged at the right side in the scanning direction with respect to the platen 5. In a case that the carriage 2 is positioned in a maintenance position which is on the right side in the scanning direction with respect to the platen 5, the plurality of nozzles 10 face or are opposite to the cap 71.

Figure 3:
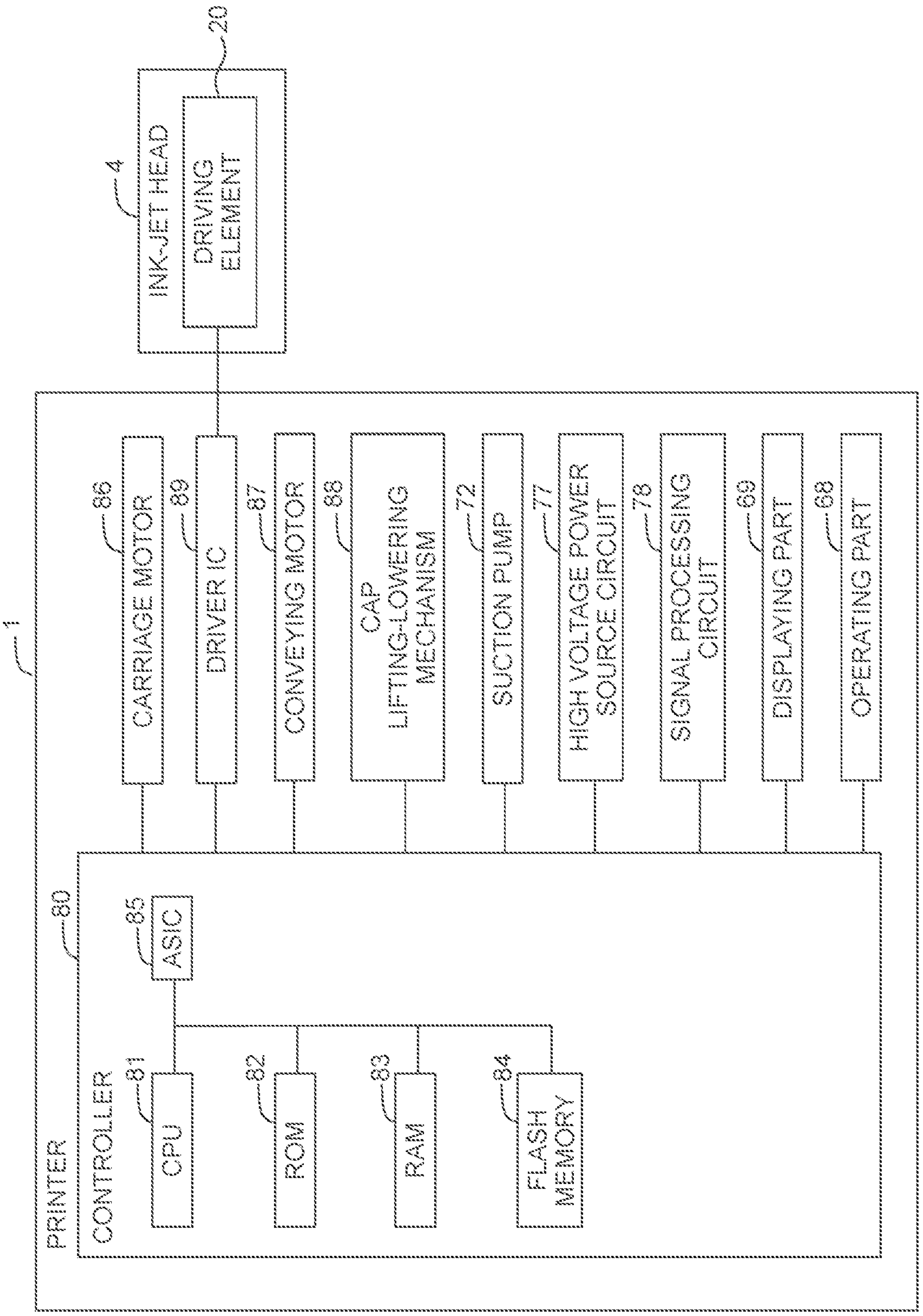
FIG. 3 is a block diagram depicting the electric configuration of a printer of a first embodiment.

Further, the cap 71 is connected to a cap lifting-lowering mechanism 88 (see FIG. 3). In a case that the cap lifting-lowering mechanism 88 is driven, the cap 71 is lifted or lowered. In a case that the cap 71 is positioned in the maintenance position, the plurality of nozzles 10 face the cap 71. In a case that the cap 71 is moved upward by the cap lifting-lowering mechanism 88 in a state that the plurality of nozzles 10 faces the cap 71, an upper end part of the cap 71 makes tight contact with the nozzle surface 4*a*, thereby providing a cap state in which the plurality of nozzles 10 are covered by the cap 71. In a state that the cap 71 is lowered by the cap lifting-lowering mechanism 88, the plurality of nozzles 10 are not covered by the cap 71. Note that it is allowable that the cap 71 is not configured such that the cap 71 makes tight contact with the nozzle surface 4*a* to thereby cover the plurality of nozzles 10. The cap 71 may be, for example, configured such that the cap 71 makes tight contact with a non-illustrated frame, etc., which is arranged in the surrounding of the nozzle surface 4*a* of the ink-jet head 4 to thereby cover the plurality of nozzles 10.

The suction pump 72 is, for example, a tube pump, etc., and is connected to the cap 71 and the waste liquid tank 73. Further, in the maintenance unit 8, in a case that the suction pump 72 is driven in the above-described cap state, it is possible to perform a so-called suction purge of discharging (exhausting) the ink inside the ink-jet head 4 from the plurality of nozzles 10. The ink discharged (exhausted) by the suction purge is stored in the waste liquid tank 73.

Note that the explanation is given herein, for the sake of convenience, that the cap 71 is configured to cover all the plurality of nozzles 10 together and that the inks inside the ink-jet head 4 are discharged (exhausted) from all the plurality of nozzles 10 in the suction purge. The aspect of the present disclosure, however, is not limited to or restricted by this. For example, it is allowable to provide such a configuration that the cap 71 is provided with, separately, a part covering nozzles 10, among the plurality of nozzles 10, constructing the rightmost nozzle row 9 included in the four nozzle rows 9 and discharging the black ink, and another part covering nozzles 10, among the plurality of nozzles 10, constructing three nozzle rows 9 on the left side among the four nozzle rows 9 and discharging the color (yellow, cyan and magenta) inks. Further, it is allowable that the liquid ejecting apparatus of the present disclosure is configured such that either one of the black ink and the color inks is (are) selectively discharged in the suction purge. Alternatively, for example, it is allowable that the liquid ejecting apparatus of the present disclosure is configured such that the cap 71 is provided as a plurality of caps each of which is provided individually on one of the four nozzle rows 9, and that each of the four color inks is discharged (exhausted), in the suction purge, individually from one of the four nozzles rows 9.

Figure 2:
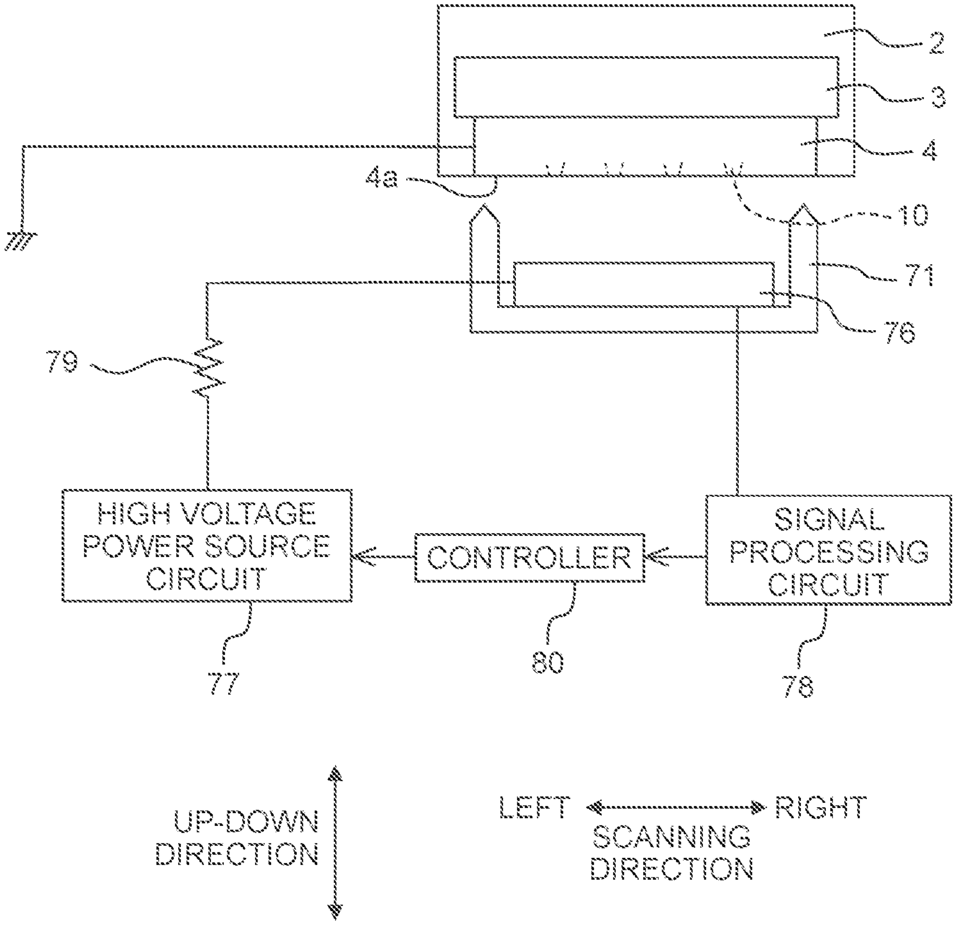
FIG. 2 is a view depicting an electrode arranged in a cap, and for explaining a connection relationship among the electrode, a high voltage power source circuit and a signal processing circuit.

Further, as depicted in FIG. 2, an electrode 76 which has a rectangular planar shape is arranged in the inside of the cap 71. The electrode 76 is connected to a high voltage power source circuit 77 via a resistor 79. Furthermore, the high voltage power source circuit 77 applies a predetermined voltage (for example, approximately 600V) to the electrode 76. On the other hand, the ink-jet head 4 is maintained at a ground potential. With this, a predetermined potential difference is generated between the ink-jet head 4 and the electrode 76. A signal processing circuit 78 is connected to the electrode 76. The signal processing circuit 78 includes a differentiating circuit, etc., and outputs a signal in accordance with a change in the voltage (voltage change) in the electrode 76. Note, however, that the signal output from the signal processing circuit 78 may be a signal of the electric current (electric current signal). Note that a combination of the electrode 76, the high voltage power source circuit 77, the signal processing circuit 78 and the resistor 79 correspond to a "signal outputting part" of the present disclosure.

Here, the present embodiment is configured such that the predetermined voltage is applied to the electrode 76, that the ink-jet head 4 is maintained at the ground potential and that the signal processing circuit 78 outputs the signal in accordance with the voltage of the electrode 76. The aspect of the present disclosure, however, is not limited to or restricted by this. It is allowable to provide such a configuration that the electrode 76 is maintained at the ground potential and the predetermined voltage is applied to the ink jet head 4, thereby causing a potential difference between the electrode 76 and the ink-jet head 4. It is also allowable to provide such a configuration that the signal processing circuit 78 is connected to the ink-jet head 4 and outputs a signal in accordance with the voltage change in the ink-jet head 4.

<Electric Configuration of Printer>

Next, the electric configuration of the printer 1 will be described. As depicted in FIG. 3, the printer 1 is provided with a controller 80. The controller 80 include a CPU (Central Processing Unit) 81, a ROM (Read Only Memory) 82, a RAM (Random Access Memory) 83, a flush memory 84 (corresponding to a "memory" of the present disclosure), an ASIC (Application Specific Integrated Circuit) 85, etc. The controller 80 controls the operation of each of the carriage motor 86, the driver IC 89, the conveying motor 87, the cap lifting-lowering mechanism 88, the suction pump 72, the high voltage power source circuit 77, etc. Note that in the first embodiment, the controller 80 controls the driver IC 89 to thereby control the plurality of driving elements 20 of the ink-jet head 4. Further, the controller 80 receives a signal from the signal processing circuit 78, etc. Further, although the ink-jet head 4 has the plurality of driving elements 20 as described above, only one piece of the driving elements 20 is depicted in FIG. 3, for the sake of convenience.

Furthermore, in addition to the configuration as explained above, the printer 1 is provided with a displaying part 69 and an operating part 68. The displaying part 69 is, for example, a liquid crystal display provided on a casing of the printer 1, etc. The controller 80 controls the displaying part 69 so as to cause the displaying part 69 to display information required for an operation of the printer 1, etc. The operating part 68 is a button provided on the casing of the printer 1, a touch panel provided on the displaying part 69, etc. The operating part 68 receives a signal based on an operation by a user and transmits the received signal to the controller 80.

Note that the controller 80 may be configured such that only the CPU 81 performs the various kinds of processing or that only the ASIC 85 performs the various kinds of processing, or that the CPU 81 and the ASIC 85 perform the various kinds of processing in a cooperative manner. Alternatively, the controller 80 may be configured such that one CPU 81 singly performs the processing, or that a plurality of pieces of the CPU 81 perform the processing in a sharing manner. Still alternatively, the controller 80 may be configured such that one ASIC 85 singly performs the processing, or that a plurality of pieces of the ASIC 85 perform the processing in a sharing manner.

<Determination as to Whether or not a Nozzle has any Abnormality>

Next, a processing for determining, in the printer 1, as to whether or not each of the plurality of nozzles 10 of the ink-jet head 4 has any abnormality will be explained below. The processing for determining as to whether or not each of the plurality of nozzles 10 has any abnormality to be explained below is performed at an appropriate timing. For example, the processing for determining as to whether or not each of the plurality of nozzles 10 has any abnormality is performed in a case that a predetermined time arrives. Alternatively, it is also allowable to perform the processing for determining as to whether or not each of the plurality of nozzles 10 has any abnormality after a recording instruction signal of instructing a recording on a recording paper sheet P is received and before a processing for the recording is started. Still alternatively, it is also allowable to perform the processing for determining as to whether or not each of the plurality of nozzles 10 has any abnormality in a case that the recording is performed on a predetermined number (quantity) of the recording paper sheet P after the above-described determining processing has been performed. Alternatively, it is also allowable to perform the processing for determining as to whether or not each of the plurality of nozzles 10 has any abnormality in a case that a predetermined error occurs in the printer 1 and then the predetermined error is resolved.

In the printer 1, the controller 80 performs a processing along a flow of FIG. 4 to thereby determine as to whether or not any abnormality is present in each of the plurality of nozzle 10 (whether each of the plurality of nozzles 10 has any abnormality). To provide a more detailed explanation regarding the flow of FIG. 4, at first, the controller 80 sets one object nozzle (target nozzle), among the plurality of nozzles 10, which is an object (target) of the determination as to whether or not the abnormality is present therein (step S101).

Next, the controller 80 provides the above-described cap state, then causes the high voltage power source circuit 77 to apply the voltage to the electrode 76, controls the carriage motor 86 so as to provide a state that the carriage 2 is positioned at the maintenance position, and then causes the driver IC 89 to output the driving signal, thereby causing the ink-jet head 4 to perform a driving for inspecting large droplet ejection (large droplet ejection-inspecting driving) in which a large droplet is ejected from the target nozzle toward the electrode 76 (step S102).

Subsequently, the controller 80 causes the flash memory 84 to store information as to whether or not the abnormality is present in the ejection of the large droplet in the target nozzle, based on the signal output from the signal outputting circuit 78 in a case that the large droplet ejection-inspecting driving is performed (step S103).

To provide more detailed explanation, in a case that the ink droplet is ejected from the nozzle 10 toward the electrode 76 in the state that the voltage is applied by the high voltage power source circuit 77 to the electrode 76, the ejected ink droplet is charged, thereby changing the voltage of the electrode 76. Namely, an electric change occurs in the electrode 76. Due to this, as depicted in FIG. 5A, the voltage value of the signal output from the signal processing circuit 78 is increased from a voltage value V0 in a case that the large droplet ejection-inspecting driving is not performed up to a maximum value Vmax, then is decreased to a minimum value Vmin, and thereafter the voltage value is increased and decreased repeatedly while being attenuated and is returned to the voltage value V0. In this situation, as the voltage change in the electrode 76 is greater, a voltage difference H between the maximum value Vmax and the minimum value Vmin (H=Vmax−Vmin) becomes greater. Further, in a case that the ink droplet is ejected normally from the nozzle 10, the voltage difference H becomes to be a value within a certain normal range. On the other hand, in a case that any abnormality is present in the ejection of the ink droplet in the nozzle 10, the voltage difference H is deviated from the normal range.

In view of this, in the processing of step S103, in a case that the voltage difference H is within a range which is not less than H2a and less than H1a (corresponding to a "normal range" of the present disclosure) as depicted in FIG. 5B, the controller 80 causes the flash memory 84 to store information indicating that the ejection of large droplet is normal regarding the target nozzle. On the other hand, in a case that the voltage difference H is not less than H1a, the controller 80 causes the flash memory 84 to store information indicating that a first abnormality is present in the ejection of large droplet regarding the target nozzle. Further, in a case that the voltage difference H is not less than H3a and less than H2a, the controller 80 causes the flash memory 84 to store information indicating that a second abnormality is present in the ejection of large droplet regarding the target nozzle. Furthermore, in a case that the voltage difference H is less than H3a, the controller 80 causes the flash memory 84 to store information indicating that a third abnormality is present in the ejection of large droplet regarding the target nozzle.

Here, the first abnormality is, for example, a spraying abnormality in which the ink ejected from the nozzle 10 is sprayed (scattered) and/or, a deflecting abnormality in which an ejecting direction of the liquid droplet ejected from the nozzle 10 deflects or is bent. The second abnormality is, for example, an ejection shortage abnormality in which the amount of the ink ejected from the nozzle 10 is smaller than an amount of the ink by which a predetermined image quality can be secured. The third abnormality is, for example, a non-ejection abnormality in which the ink droplet is not ejected or is hardly ejected and a dot cannot be formed on the recording paper P. Namely, in the second abnormality, the amount of the ink ejected from the nozzle 10 is smaller than that in the normal state, and in the third abnormality, the amount of the ink ejected from the nozzle 10 is further smaller than that in the second abnormality. Note that the H1a, H2a and H3a in FIG. 5B is in a magnitude relationship of H3a<H2a<H1a.

Next, the controller 80 provides the above-described cap state, then causes the high voltage power source circuit 77 to apply the voltage to the electrode 76, controls the carriage motor 86 so as to maintain the carriage 2 to be positioned at the maintenance position, and then causes the driver IC 89 to output the driving signal. With this, the controller 80 causes the ink-jet head 4 to perform a driving for inspecting medium droplet ejection (medium droplet ejection-inspecting driving) in which a medium droplet is ejected from the target nozzle toward the electrode 76 (step S104).

Subsequently, the controller 80 causes the flash memory 84 to store information as to whether or not the abnormality is present in the ejection of the medium droplet in the target nozzle, based on the signal output from the signal outputting circuit 78 in a case that the medium droplet ejection-inspecting driving is performed (step S105). In a processing of step S105, in a case that the voltage difference H is within a range which is not less than H2b and less than H1b (corresponding to the "normal range" of the present disclosure) as depicted in FIG. 5C, the controller 80 causes the flash memory 84 to store information indicating that the ejection of medium droplet is normal regarding the target nozzle. On the other hand, in a case that the voltage difference H is not less than H1b, the controller 80 causes the flash memory 84 to store information indicating that the first abnormality is present in the ejection of medium droplet regarding the target nozzle. Further, in a case that the voltage difference H is not less than H3b and less than H2b, the controller 80 causes the flash memory 84 to store information indicating that the second abnormality is present in the ejection of medium droplet regarding the target nozzle. Furthermore, in a case that the voltage difference H is less than H3b, the controller 80 causes the flash memory 84 to store information indicating that the third abnormality is present in the ejection of medium droplet regarding the target nozzle. Note that the H1b, H2b and H3b in FIG. 5C is in a magnitude relationship of H3b<H2b<H1b.

Next, the controller 80 provides the above-described cap state, then causes the high voltage power source circuit 77 to apply the voltage to the electrode 76, controls the carriage motor 86 so as to cause the carriage 2 to be positioned at the maintenance position. In such a state, the controller 80 causes the driver IC 89 to output the driving signal, thereby causing the ink-jet head 4 to perform a driving for inspecting small droplet ejection (small droplet ejection-inspecting driving) in which a small droplet is ejected from the target nozzle toward the electrode 76 (step S106).

Subsequently, the controller 80 causes the flash memory 84 to store information as to whether or not the abnormality is present in the ejection of the small droplet in the target nozzle, based on the signal output from the signal outputting circuit 78 in a case that the small droplet ejection-inspecting driving is performed (step S107). In a processing of step S107, in a case that the voltage difference H is within a range which is not less than H2c and less than H1c (corresponding to the "normal range" of the present disclosure) as depicted in FIG. 5D, the controller 80 causes the flash memory 84 to store information indicating that the ejection of small droplet is normal regarding the target nozzle. On the other hand, in a case that the voltage difference H is not less than H1c, the controller 80 causes the flash memory 84 to store information indicating that the first abnormality is present in the ejection of small droplet regarding the target nozzle. Further, in a case that the voltage difference H is not less than H3c and less than H2c, the controller 80 causes the flash memory 84 to store information indicating that the second abnormality is present in the ejection of small droplet regarding the target nozzle. Furthermore, in a case that the voltage difference H is less than H3c, the controller 80 causes the flash memory 84 to store information indicating that the third abnormality is present in the ejection of small droplet regarding the target nozzle. Note that the H1c, H2c and H3c of FIG. 5D are in a magnitude relationship of H3c<H2c<H1c. Further, the H3a, H3b and H3c of FIGS. 5B to 5D each correspond to a "threshold value" of the present disclosure.

Note that in the present embodiment, the processings, respectively, in steps S102 to S107 of performing determination as to whether or not the target nozzle is normal, of performing determination as to whether or not the target nozzle has the first abnormality, of performing determination as to whether or not the target nozzle has the second abnormality, and of performing determination as to whether or not the target nozzle has the third abnormality each correspond to a "determining processing" of the present disclosure. Further, in the present embodiment, any one (arbitrary one) of the large dot, the medium dot and the small dot corresponds to a "first dot" of the present disclosure, and another one corresponds to a "second dot" of the present disclosure. Furthermore, in the present disclosure, an ejection of an ink droplet for forming the first dot among the large droplet, the medium droplet and the small droplet corresponds to a "first ejection" of the present disclosure, and an ejection of an ink droplet for forming the second dot among the large droplet, the medium droplet and the small droplet corresponds to a "second ejection" of the present disclosure. Moreover, one of the large droplet ejection-inspecting driving, the medium droplet ejection-inspecting driving and the small droplet ejection-inspecting driving which corresponds to the first ejection corresponds to a "driving for performing the first ejection", and another one of the large droplet ejection-inspecting driving, the medium droplet ejection-inspecting driving and the small droplet ejection-inspecting driving which corresponds to the second ejection corresponds to a "driving for performing the second ejection".

Next, the controller 80 determines as to whether or not a latest-performed determining processing which has been performed the latest (the processing of any one of steps S102 to S107) is a firstly-performed determining processing performed first after the suction purge has been performed regarding the target nozzle (step S108). In a case that the latest-performed determining processing which has been performed the latest is not the firstly-performed determining processing performed first after the suction purge has been performed regarding the target nozzle (step S108: NO), the controller 80 proceeds to a processing of step S110. On the other hand, in a case that the latest-performed determining processing which has been performed the latest is the firstly-performed determining processing performed first after the suction purge has been performed regarding the target nozzle (step S108: YES), the controller 80 executes a non-recoverability determining processing (step S109) and then proceeds to the processing of step S110.

In the non-recoverability determining processing, the controller 80 performs the processing along the flow of FIGS. 6A and 6B. To provide a detailed explanation regarding the flow of FIGS. 6A and 6B, the controller 80 first determines as to whether or not the first abnormality is present in the ejection of large droplet in the target nozzle (step S201), based on the information stored in the flash memory 84 in the processing of step S103. In a case that the first abnormality is not present in the ejection of large droplet in the target nozzle (step S201: NO), the controller 80 rests a value of a parameter F1a regarding the target nozzle to be 0 (zero) (step S202), and then proceeds to a processing of step S205. In a case that the first abnormality is present in the ejection of large droplet in the target nozzle (step S201: YES), the controller 80 increases, by one, (increments) the value of the parameter F1a regarding the target nozzle (step S203).

Here, the value of the parameter F1a is reset to be 0 (zero) at a time of shipping of the printer 1, the value of the parameter F1a is incremented in the processing of step S203 as described above, and the value of the parameter F1a is reset to be 0 (zero) in the processing of step S202 as described above. With this, for example, a situation that the value of the parameter F1a is N, the N being a positive integer, means that a determination that the first abnormality is present in the ejection of large droplet is made in each, of a plurality of times of the determination as to whether or not the first abnormality is present in the ejection of large droplet, which is executed first after one of a continuous N times of the suction purge.

Subsequent to the processing of step S203, the controller 80 determines as to whether or not the value of the parameter F1a is not less than a threshold value F1t (step S204). The threshold value F1t is a positive integer. In a case that the value of the parameter F1a is less than the threshold value F1t (step S204: NO), the controller 80 proceeds to the processing of step S205. In a case that the value of the parameter F1a is not less than the threshold value F1t (step S204: YES), the controller 80 determines that the target nozzle has a flaw abnormality due to which the spraying abnormality or the deflecting abnormality occurs in the ink droplet ejected from the target nozzle; the controller 80 causes the flash memory 84 to store the target nozzle as a non-recoverable nozzle which cannot be restored or recovered by the suction purge (step S213), and returns to the flow of FIG. 4.

In the processing of step S205, the controller 80 determines as to whether or not the first abnormality is present in the ejection of medium droplet in the target nozzle, based on the information stored in the flash memory 84 in the processing of step S105. In a case that the first abnormality is not present in the ejection of medium droplet in the target nozzle (step S205: NO), the controller 80 resets a value of a parameter F1b regarding the target nozzle to be 0 (zero) (step S206), and then proceeds to a processing of step S209. In a case that the first abnormality is present in the ejection of medium droplet in the target nozzle (step S205: YES), the controller 80 increases, by one, (increments) the value of the parameter F1b regarding the target nozzle (step S207).

Here, the value of the parameter F1b is reset to be 0 (zero) at the time of shipping of the printer 1, the value of the parameter F1b is incremented in the processing of step S207 as described above, and the value of the parameter F1b is reset to be 0 (zero) in the processing of step S206 as described above. With this, for example, a situation that the value of the parameter F1b is N means that a determination that the first abnormality is present in the ejection of medium droplet is made in each, of a plurality of times of the determination as to whether or not the first abnormality is present in the ejection of medium droplet, which is executed first after one of the continuous N times of the suction purge.

Subsequent to the processing of step S207, the controller 80 determines as to whether or not the value of the parameter F1b is not less than the threshold value F1t (step S208). In a case that the value of the parameter F1b is less than the threshold value F1t (step S208: NO), the controller 80 proceeds to the processing of step S209. In a case that the value of the parameter F1b is not less than the threshold value F1t (step S208: YES), the controller 80 determines that the target nozzle has the flaw abnormality; the controller 80 causes the flash memory 84 to store the target nozzle as a non-recoverable nozzle which cannot be recovered by the suction purge (step S213), and returns to the flow of FIG. 4.

In step S209, the controller 80 determines as to whether or not the first abnormality is present in the ejection of small droplet in the target nozzle, based on the information stored in the flash memory in the processing of step S107. In a case that the first abnormality is not present in the ejection of small droplet in the target nozzle (step S209: NO), the controller 80 rests a value of a parameter F1c regarding the target nozzle to be 0 (zero) (step S210), and then returns to the flow of FIG. 4. In a case that the first abnormality is present in the ejection of small droplet in the target nozzle (step S209: YES), the controller 80 increases, by one, (increments) the value of the parameter F1c regarding the target nozzle (step S211).

Here, the value of the parameter F1c is reset to be 0 (zero) at the time of shipping of the printer 1, the value of the parameter F1c is incremented in the processing of step S211 as described above, and the value of the parameter F1c is reset to be 0 (zero) in the processing of step S210 as described above. With this, for example, a situation that the value of the parameter F1c is N means that a determination that the first abnormality is present in the ejection of small droplet is made in each, of a plurality of times of the determination as to whether or not the first abnormality is present in the ejection of small droplet, which is executed first after one of a continuous N times of the suction purge.

Subsequent to the processing of step S211, the controller 80 determines as to whether or not the value of the parameter F1c is not less than the threshold value F1t (step S212). In a case that the value of the parameter F1c is less than the threshold value F1t (step S212: NO), the controller 80 returns to the flow of FIG. 4. In a case that the value of the parameter F1a is not less than the threshold value F1t (step S212: YES), the controller 80 determines that the target nozzle has the flaw abnormality; the controller 80 causes the flash memory 84 to store the target nozzle as a non-recoverable nozzle which cannot be recovered by the suction purge (step S213), and returns to the flow of FIG. 4.

Returning to FIG. 4 and after the non-recoverability determining processing of step S109, in a case that the determinations as to whether or not the abnormality is present, respectively, in the ejection of large droplet, in the ejection of medium droplet and in the ejection of small droplet have not been completed with respect to all of the plurality of nozzles 10 (step S110: NO), the controller 80 changes the target nozzle to another nozzle 10 for which the above-described determinations have not been completed (step S111) and then returns to the processing of step S102. Further, in a case that the determinations as to whether or not the abnormality is present, respectively, in the ejection of large droplet, in the ejection of medium droplet and in the ejection of small droplet have been completed with respect to all of the plurality of nozzles 10 (step S110: YES), the controller 80 ends the processing.

Furthermore, in a case that the processing is performed along the flow of FIG. 4, abnormality information, regarding each of the ejection of large droplet, the ejection of medium droplet and the ejection of small droplet, indicating as to whether or not each of the plurality of nozzles 10 of the ink-jet head 4 is normal, whether or not each of the plurality of nozzles 10 of the ink-jet head 4 has the first abnormality, whether or not each of the plurality of nozzles 10 has the second abnormality and whether or not each of the plurality of nozzles 10 has the third abnormality is stored in the flash memory 84.

<Processing at the Time of Recording>

Next, a processing by the controller 80 in a case that recording with respect to the recording paper sheet P is performed in the printer 1 will be explained. In the printer 1, in a case that the controller 80 receives a recording instructing signal of instructing the recording on the recording paper sheet P, the controller 80 performs the processing along a flow of FIG. 7.

To provide a detailed explanation regarding the flow of FIG. 7, the controller 80 firstly determines as to whether or not a number Xa of the nozzle 10 which has the abnormality in the ejection of large droplet and which is not stored as the non-recoverable nozzle is not less than a predetermined number Xat, based on the abnormality information stored in the flash memory 84 (step S301). In a case that the number Xa of the nozzle 10 is not less than the predetermined number Xat (step S301: YES), the controller 80 proceeds to a processing of step S305.

In a case that the number Xa of the nozzle 10 is less than the predetermined number Xat (step S301: NO), the controller 80 subsequently determines as to whether or not a number Xb of the nozzle 10 which has the abnormality in the ejection of medium droplet and which is not stored as the non-recoverable nozzle is not less than a predetermined number Xbt, based on the abnormality information stored in the flash memory 84 (step S302). In a case that the number Xb of the nozzle 10 is not less than the predetermined number Xbt (step S302: YES), the controller 80 proceeds to the processing of step S305.

In a case that the number Xb of the nozzle 10 is less than the predetermined number Xbt (step S302: NO), the controller 80 subsequently determines as to whether or not a number Xc of the nozzle 10 which has the abnormality in the ejection of small droplet and which is not stored as the non-recoverable nozzle is not less than a predetermined number Xct, based on the abnormality information stored in the flash memory 84 (step S303). In a case that the number Xc of the nozzle 10 is not less than the predetermined number Xct (step S303: YES), the controller 80 proceeds to the processing of step S305.

In a case that the number Xc of the nozzle 10 is less than the predetermined number Xct (step S303: NO), the controller 80 subsequently determines as to whether or not a number Xd of the nozzle 10 which has the abnormality in any one of the ejection of large droplet, the ejection of the medium droplet and the ejection of the small droplet and which is not stored as the non-recoverable nozzle is not less than a predetermined number Xdt, based on the abnormality information stored in the flash memory 84 (step S304). In a case that the number Xd of the nozzle 10 is not less than the predetermined number Xdt (step S304: YES), the controller 80 proceeds to the processing of step S305. In a case that the number Xd of the nozzle 10 is less than the predetermined number Xdt (step S304: NO), the controller 80 proceeds to a processing of step S306.

In the processing of step S305, the controller 80 executes a purge processing. In the purge processing, the controller 80 controls the carriage motor 86, the cap lifting-lowering mechanism 88, the suction pump 72, etc., to thereby perform the above-described suction purge. Further, after the purge processing of step S305, the controller 80 proceeds to the processing of step S306.

In the processing of step S306, the controller 80 executes a recording processing. In the recording processing, the controller 80 performs recording on the recording paper sheet P by repeatedly and alternately executing a recording pass of causing the ink-jet head 4 so as to eject the ink(s) from the plurality of nozzles 10 toward the recording paper sheet P while controlling the carriage motor 86 so as to cause the carriage 2 to move in the scanning direction, and a conveying operation of controlling the conveying motor 87 so as to cause the conveying rollers 6 and 7 to convey the recording paper sheet P in the conveyance direction.

Note that in the present embodiment, any arbitrary one of the predetermined numbers Xat, Xbt and Xct corresponds to a "first predetermined number" of the present disclosure, and another one of the predetermined numbers Xat, Xbt and Xct corresponds to a "second predetermined number" of the present disclosure. Further, the predetermined number Xdt corresponds to a "third predetermined number" of the present disclosure. Furthermore, a condition which is included in a condition that the number Xa of the nozzle 10 is not less than the predetermined number Xat, a condition that the number Xb of the nozzle 10 is not less than the predetermined number Xbt, a condition that the number Xc of the nozzle 10 is not less than the predetermined number Xct and which corresponds to the first predetermined number corresponds to a "first condition" of the present disclosure; and another condition which is included in the above-described three conditions and which corresponds to the second predetermined number corresponds to a "second condition" of the present disclosure. Moreover, condition that the number Xd of the nozzle 10 is not less than the predetermined number Xdt corresponds to a "third condition" of the present disclosure.

<Technical Effect of Embodiment>

In the present embodiment, in a case that the voltage difference H which is indicated by the signal output from the signal processing circuit 78 and which is in accordance with the magnitude of voltage change in the electrode 76 is within the normal range, the controller 80 determines that the nozzle 10 is normal; in a case that the voltage difference H is greater than the normal range, the controller 80 determines that the first abnormality is present in the nozzle 10. With this, it is possible to determine as to whether or not the abnormality is present in the nozzle correctly, as compared with the case that the nozzle 10 is determined to be normal always in a case that the voltage change in the electrode 76 is large to be not less than a predetermined extent (value).

Further, in the present embodiment, in a case that the voltage difference H indicated by the signal output from the signal processing circuit 78 is smaller than the normal range, the controller 80 determines that the nozzle 10 has the second abnormality under a condition that the voltage difference H is not less than the threshold value (H3a, H3b, H3c), and that the nozzle 10 has the third abnormality under a condition that the voltage difference H is less than the threshold value (H3a, H3b, H3c). With this, it is possible to determine as to whether or not the nozzle 10 is normal, whether or not the nozzle 10 has the first abnormality, whether or not the nozzle 10 has the second abnormality or whether or not the nozzle 10 has the third abnormality.

In a case that the spraying abnormality and the deflecting abnormality occur, the voltage change in the electrode 76 becomes great. Accordingly, it is possible to determine as to whether or not at least one of the spraying abnormality and the deflecting abnormality as the first abnormality is present in the nozzle 10, based on whether or not the voltage difference H indicated by the signal output from the signal processing circuit 78 is greater than the normal range.

Further, regarding the spraying abnormality and the deflecting abnormality which are caused by a reason different from the flaw abnormality, there is a possibility that the spraying abnormality and the deflecting abnormality might be recovered by the suction purge. However, regarding the spraying abnormality and the deflecting abnormality which are caused by the flaw abnormality cannot be recovered by the suction purge. In view of this, in the present embodiment, the controller 80 determines that a certain nozzle 10, of the plurality of nozzles 10, has the flaw abnormality in a case that any one of the values of the parameters F1a, F1b and F1c regarding the certain nozzle 10 becomes to be not less than the threshold value F1t, namely, in a case that the certain nozzle 10 is determined to have the first abnormality, by the controller 80, in each of a plurality of times of the determination, which is executed first after one of a continuous first predetermined number of times of the discharging processing.

Further, as described above, since the flaw abnormality is not recovered by the suction purge, the controller 80 causes the nozzle which is determined by the controller 80 to have the flaw abnormality to be stored as the non-recoverable nozzle.

Furthermore, a nozzle 10 which is included in the nozzles 10 having the abnormality and which is not stored as the non-recoverable nozzle is highly likely to be recovered by the suction purge. In view of this, in the present embodiment, the purge processing is executed in the case that the number Xa of the nozzles 10 which have the abnormality in the ejection of large droplet and which are not stored as the non-recoverable nozzle is not less than the predetermined number Xat. Further, in the present embodiment, the purge processing is executed in the case that the number Xb of the nozzles 10 which have the abnormality in the ejection of medium droplet and which are not stored as the non-recoverable nozzle is not less than the predetermined number Xbt. Furthermore, in the present embodiment, the purge processing is executed in the case that the number Xc of the nozzles 10 which have the abnormality in the ejection of small droplet and which are not stored as the non-recoverable nozzle is not less than the predetermined number Xct. Moreover, in the present embodiment, the purge processing is executed in the case that the number Xd of the nozzles 10 which have the abnormality in any one of the ejection of large droplet, the ejection of medium droplet and the ejection of small droplet and which are not stored as the non-recoverable nozzle is not less than the predetermined number Xdt. With this, in the present embodiment, the suction purge is performed in a case that the number of the nozzle 10 which has the abnormality and which is highly like to be recovered by the suction purge becomes to be large, thereby making it possible to recover the abnormality in these nozzles 10.

Further, in the present embodiment, the nozzle 10 can be recovered by causing the ink to be discharged from the nozzle 10 by the suction purge, as described above.

Furthermore, even regarding a same nozzle 10, whether or not the nozzle 10 is normal depending on the kind of ink droplet (large droplet, medium droplet and small droplet) and a state as to whether or not which kind of abnormality is present therein are different, in some cases. In view of this, in the present embodiment, the controller 80 determines as to whether or not the nozzle 10 is normal, individually regarding the ejection of large droplet, the ejection of medium droplet and the ejection of small droplet, as described above.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<Modifications>

Although the embodiment of the present disclosure is explained above, the aspect of the present disclosure is not limited to the above-described embodiment; various changes or modifications may be made to the embodiment, without departing from the claims.

The non-recoverability determining processing is not limited to that of the above-described embodiment. For example, in a first modification, the controller 80 performs the processing, in the non-recoverability determining processing, along a flow of FIG. 8. To provide a more detailed explanation, the controller 80 firstly executes a first non-recoverability determining processing (step S401). In the first non-recoverability determining processing, the controller 80 performs the processing along a flow of FIGS. 9A and 9B.

To provide a more detailed explanation, the controller 80 determines as to whether or not the first abnormality is present in the ejection of large droplet regarding a target nozzle, based on the information stored in the flash memory 84 in the processing of step S103 (step S501). In a case that the first abnormality in the ejection of large droplet is not present regarding the target nozzle (step S501: NO), the controller 80 resets a value of a parameter F1a regarding the target nozzle to be 0 (zero) (step S502) and then proceeds to a processing of step S505. In a case that the first abnormality in the ejection of large droplet is present regarding the target nozzle (step S501: YES), the controller 80 increases, by one, (increments) the value of the parameter F1a regarding the target nozzle (step S503). Here, the parameter F1a is similar to that explained in the above-described embodiment.

Subsequent to the processing of step S503, the controller 80 determines as to whether or not the value of the parameter F1a is not less than a threshold value F1t (step S504). In a case that the value of the parameter F1a is less than the threshold value F1t (step S504: NO), the controller 80 proceeds to a processing of step S505. In a case that the value of the parameter F1a is not less than the threshold value F1t (step S504: YES), the controller 80 causes the flash memory 84 to store the target nozzle as a non-recoverable nozzle (step S513), and returns to the flow of FIG. 8.

In the processing of step S505, the controller 80 determines as to whether or not the second abnormality in the ejection of large droplet is present regarding the target nozzle, based on the information stored in the flash memory in step S103. In a case that the second abnormality in the ejection of large droplet is not present regarding the target nozzle (step S505: NO), the controller 80 resets a value of a parameter F2a regarding the target nozzle to be 0 (zero) (step S506), and then proceeds to a processing of step S509. In a case that the second abnormality in the ejection of large droplet is present regarding the target nozzle (step S505: YES), the controller 80 increases, by one, (increments) the value of the parameter F2a regarding the target nozzle (step S507).

Here, the value of the parameter F2a is reset to be 0 (zero) at the time of shipping of the printer 1, the value of the parameter F2a is incremented in the processing of step S507 as described above, and the value of the parameter F2a is reset to be 0 (zero) in the processing of step S506 as described above. With this, for example, a situation that the value of the parameter F2a is N means that a determination that the second abnormality is present in the ejection of large droplet is made in each, of a plurality of times of the determination as to whether or not the second abnormality is present in the ejection of large droplet, which is executed first after one of a continuous N times of the suction purge.

Subsequent to the processing of step S507, the controller 80 determines as to whether or not the value of the parameter F2a is not less than a threshold value F2t (step S508). The threshold value F2t is a positive integer greater than the threshold value F1t. In a case that the value of the parameter F2a is less than the threshold value F2t (step S508: NO), the controller 80 proceeds to the processing of step S509. In a case that the value of the parameter F2a is not less than the threshold value F2t (step S508: YES), the controller 80 causes the flash memory 84 to store the target nozzle as a non-recoverable nozzle (step S513), and returns to the flow of FIG. 8.

In the processing of step S509, the controller 80 determines as to whether or not the third abnormality in the ejection of large droplet is present regarding the target nozzle, based on the information stored in the flash memory in step S103. In a case that the third abnormality in the ejection of large droplet is not present regarding the target nozzle (step S509: NO), the controller 80 resets a value of a parameter F3a regarding the target nozzle to be 0 (zero) (step S510), and then returns to the flow of FIG. 4. In a case that the third abnormality in the ejection of large droplet is present regarding the target nozzle (step S509: YES), the controller 80 increases, by one, (increments) the value of the parameter F3a regarding the target nozzle (step S511).

Here, the value of the parameter F3a is reset to be 0 (zero) at the time of shipping of the printer 1, the value of the parameter F3a is incremented in the processing of step S511 as described above, and the value of the parameter F3a is reset to be 0 (zero) in the processing of step S510 as described above. With this, for example, a situation that the value of the parameter F3a is N means that a determination that the third abnormality is present in the ejection of large droplet is made in each, of a plurality of times of the determination as to whether or not the third abnormality is present in the ejection of large droplet, which is executed first after one of a continuous N times of the suction purge.

Subsequent to the processing of step S511, the controller 80 determines as to whether or not the value of the parameter F3a is not less than a threshold value F3t (step S512). The threshold value F3t is a positive integer greater than the threshold value F1t and smaller than the threshold value F2t. In a case that the value of the parameter F3a is less than the threshold value F3t (step S512: NO), the controller 80 returns to the flow of FIG. 8. In a case that the value of the parameter F3a is not less than the threshold value F3t (step S512: YES), the controller 80 causes the flash memory 84 to store the target nozzle as a non-recoverable nozzle (step S513), and returns to the flow of FIG. 8.

Returning to FIG. 8, subsequent to the first non-recoverability determining processing of step S401, the controller 80 determines as to whether or not the target nozzle is stored as the non-recoverable nozzle in the first non-recoverability determining processing (step S402). In a case that the target nozzle is stored as the non-recoverable nozzle in the first non-recoverability determining processing (step S402: YES), the controller 80 returns to the flow of FIG. 4. In a case that the target nozzle is not stored as the non-recoverable nozzle in the first non-recoverability determining processing (step S402: NO), the controller 80 subsequently executes a second non-recoverability determining processing (step S403).

In the second non-recoverability determining processing, the controller 80 performs the processing along a flow in FIGS. 9A and 9B in which the large droplet is replaced by the medium droplet and the parameters F1a, F2a and F3a are replaced by parameters F1b, F2b and F3b. Here, the parameter F1b is similar to that explained in the above-described embodiment.

Further, the value of the parameter F2b is reset to be 0 (zero) at the time of shipping of the printer 1, the value of the parameter F2b is incremented in the processing of step S507 as described above, and the value of the parameter F2b is reset to be 0 (zero) in the processing of step S506 as described above. With this, for example, a situation that the value of the parameter F2b is N means that a determination that the second abnormality is present in the ejection of medium droplet is made in each, of a plurality of times of the determination as to whether or not the second abnormality is present in the ejection of medium droplet, which is executed first after one of a continuous N times of the suction purge.

Furthermore, the value of the parameter F3b is reset to be 0 (zero) at the time of shipping of the printer 1, the value of the parameter F3b is incremented in the processing of step S511 as described above, and the value of the parameter F3b is reset to be 0 (zero) in the processing of step S510 as described above. With this, for example, a situation that the value of the parameter F3b is N means that a determination that the third abnormality is present in the ejection of medium droplet is made in each, of a plurality of times of the determination as to whether or not the third abnormality is present in the ejection of medium droplet, which is executed first after one of a continuous N times of the suction purge.

Subsequent to the second non-recoverability determining processing of step S403, the controller 80 determines as to whether or not the target nozzle is stored as the non-recoverable nozzle in the second non-recoverability determining processing (step S404). In a case that the target nozzle is stored as the non-recoverable nozzle in the second non-recoverability determining processing (step S404: YES), the controller 80 returns to the flow of FIG. 4. In a case that the target nozzle is not stored as the non-recoverable nozzle in the second non-recoverability determining processing (step S404: NO), the controller 80 subsequently executes a third non-recoverability determining processing (step S405).

In the third non-recoverability determining processing, the controller 80 performs the processing along a flow in FIGS. 9A and 9B in which the large droplet is replaced by the small droplet and the parameters F1a, F2a and F3a are replaced by parameters F1c, F2c and F3c. Here, the parameter F1c is similar to that explained in the above-described embodiment.

Further, the value of the parameter F2c is reset to be 0 (zero) at the time of shipping of the printer 1, the value of the parameter F2c is incremented in the processing of step S507 as described above, and the value of the parameter F2c is reset to be 0 (zero) in the processing of step S506 as described above. With this, for example, a situation that the value of the parameter F2c is N means that a determination that the second abnormality is present in the ejection of small droplet is made in each, of a plurality of times of the determination as to whether or not the second abnormality is present in the ejection of small droplet, which is executed first after one of a continuous N times of the suction purge.

Furthermore, the value of the parameter F3c is reset to be 0 (zero) at the time of shipping of the printer 1, the value of the parameter F3c is incremented in the processing of step S511 as described above, and the value of the parameter F3c is reset to be 0 (zero) in the processing of step S510 as described above. With this, for example, a situation that the value of the parameter F3c is N means that a determination that the third abnormality is present in the ejection of small droplet is made in each, of a plurality of times of the determination as to whether or not the third abnormality is present in the ejection of small droplet, which is executed first after one of a continuous N times of the suction purge.

Regarding the first abnormality such as the spraying abnormality and the deflecting abnormality which are highly likely to be the flaw abnormality, there is a lower possibility that the first abnormality is recovered by the suction purge, than the second abnormality such as the non-ejection abnormality. Further, there is a lower possibility that the third abnormality such as the non-ejection abnormality is recovered by the discharging operation, than the second abnormality.

In view of the above situation, in a first modification, the controller 80 causes the flash memory 84 to store, as a non-recoverable nozzle, a nozzle 10 which is included in the plurality of nozzles 10 and which is determined to have the first abnormality in each, of a plurality of times of the determining processing as to whether or not the first abnormality is present, which is executed first after one of a continuous F1t times (a "first predetermined number of times" of the present disclosure) of the suction purge (a nozzle 10 in which the value of each of the parameters F1a, F1b and F1c becomes to be not less than the threshold value F1t). Further, the controller 80 causes the flash memory 84 to store, as a non-recoverable nozzle, a nozzle 10 which is included in the plurality of nozzles 10 and which is determined to have the second abnormality in each, of a plurality of times of the determining processing as to whether or not the second abnormality is present, which is executed first after one of a continuous F2t times (a "second predetermined number of times" of the present disclosure), which is greater than the Ft1 number of times, of the suction purge (a nozzle 10 in which the value of each of the parameters F2a, F2b and F2c becomes to be not less than the threshold value F2t). Furthermore, the controller 80 causes the flash memory 84 to store, as a non-recoverable nozzle, a nozzle 10 which is included in the plurality of nozzles 10 and which is determined to have the third abnormality in each, of a plurality of times of the determining processing as to whether or not the third abnormality is present, which is executed first after one of a continuous F3t times (a "third predetermined number of times" of the present disclosure), which is greater than the Ft1 times and smaller than the F2t times, of the suction purge (a nozzle 10 in which the value of each of the parameters F3a, F3b and F3c becomes to be not less than the threshold value F3t).

With this, it is possible to cause the flash memory 84 to store, as the non-recoverable nozzle, each of the nozzle 10 having the first abnormality, the nozzle 10 having the second abnormality and the nozzle 10 having the third abnormality, appropriately in accordance with the highness of the possibility (likeliness) that the nozzle 10 might be (can be) recovered by the suction purge.

Further, the non-recoverable nozzle is less likely to be recovered even if the suction purge were performed therefor. Accordingly, in a case that the number (quantity) of the non-recoverable nozzle becomes to be large, it is difficult to recover the quality of an image which is (to be) recorded. In view of this, in a second modification, for example, the controller 80 performs the processing along a flow of FIG. 10A while the electric power is being supplied to the printer 1.

To provide a more detailed explanation, the controller 80 stands by in a case that a number Y of the non-recoverable nozzle stored in the flash memory 84 is less than a predetermined number Yt (a "fourth predetermined number" of the present disclosure) (step S601: NO); whereas the controller 80 causes the displaying part 69 to display a screen (image) 90 for urging exchange of the ink-jet head 4 (step S602), as depicted in FIG. 10B, in a case that the number Y of the non-recoverable nozzle becomes to be not less than the predetermined number Yt (step S601: YES). The screen 90 has a message part 91 (an "object" of the present disclosure). The message part 91 is a part in which a message, for recommending the user to exchange of the ink-jet head 4 since the number of the non-recoverable nozzle becomes to be great, is displayed.

Further, the controller 80 causes the displaying part 69 to display the screen 90 until the ink-jet head 4 is exchanged (step S603: NO); the controller 80 controls the displaying part 69 so as to release the display of the screen 90 (step S604) in a case that the ink-jet head 4 is exchanged (step S603: YES), and returns to the processing of step S601. Here, the controller 80 determines that the ink-jet head 4 is exchanged in the processing of step S603 in a case, for example, that after the controller 80 causes the displaying part 69 to display the screen 90 in the processing of step S602, the user performs an operation of input in the operating part 68 that the ink-jet head 4 has been exchanged.

In the second modification, in a case that the number of the non-recoverable nozzle becomes to be great, it is possible to perform the notification for urging the user to exchange the ink-jet head 4, by causing the displaying part 69 to display the screen 90.

Further, in the second modification, although the displaying part 69 is caused to display the screen 90 of urging the exchange of the ink-jet head 4 to thereby perform the notification of urging the user to exchange the ink-jet head 4, it is allowable to perform the notification by another method. For example, a lamp may be provided on the printer 1, and the lamp may be lighted, blinked, etc., to thereby make the notification for urging the user to exchange the ink-jet head 4. Alternatively, for example, a speaker may be provided on the printer 1, and a predetermined sound may be made in the speaker at a constant time interval to thereby make the notification for urging the user to exchange the ink-jet head 4. Still alternatively, it is also allowable to cause a display of a PC (personal computer) and/or a screen of a smartphone each of which is connected to the printer 1 so that a communication is made possible therebetween, to thereby make the notification for urging the user to exchange the ink-jet head 4.

Furthermore, in the above-described embodiment, the controller 80 determines as to whether the nozzle 10 is normal, whether the nozzle 10 has the first abnormality, whether the nozzle 10 has the second abnormality and whether the nozzle 10 has the third abnormality, based on the voltage difference H between the maximum value Vmax and the minimum value Vmin of the voltage in the signal output from the signal processing circuit 78 in the case that the inspecting driving is performed. The aspect of the present disclosure, however, is not limited to this.

In a third modification, as depicted in FIGS. 11A and 11B, the controller 80 determines that a nozzle 10 is normal in a case that a voltage difference Hx ($Hx=Vmax-V0$) between the maximum value Vmax and the voltage value V0 of the voltage in the signal output from the signal processing circuit 78 in a case that the inspecting driving is performed is within a normal range ($Hx2 \le Hx < Hx1$). In a case that the voltage difference Hx is not less than the normal range ($Hx \ge Hx1$), the controller 80 determines that the nozzle 10 has the first abnormality. In a case that the voltage difference Hx is smaller than the normal range ($Hx < Hx2$) and that the voltage value Hx is not less than a threshold value ($Hx3 \le Hx < Hx2$), the controller 80 determines that the nozzle 10 has the second abnormality. In a case that the voltage difference Hx is less than the threshold value (Hx<Hx3), the controller 80 determines that the nozzle 10 has the third abnormality. Note that also in the third modification, the controller 80 may perform the above-described determination regarding each of the ejection of large droplet, the ejection of medium droplet and the ejection of small droplet, in a similar manner as in the above-described embodiment. In this case, it is allowable to set the above-described "Hx1", "Hx2" and "Hx3" individually with respect to each of the ejection of large droplet, the ejection of medium droplet and the ejection of small droplet.

In a fourth modification, as depicted in FIGS. 11A and 11C, the controller 80 determines that a nozzle 10 is normal in a case that a voltage difference Hy (Hy=V0−Vmin) between the voltage value V0 and the minimum value Vmin of the voltage in the signal output from the signal processing circuit 78 in a case that the inspecting driving is performed is within a normal range (Hy2≤Hy<Hy1). In a case that the voltage difference Hy is not less than the normal range (Hy≥Hy1), the controller 80 determines that the nozzle 10 has the first abnormality. In a case that the voltage difference Hy is smaller than the normal range (Hy<Hy2) and that the voltage difference Hy is not less than a threshold value (Hy3≤Hy<Hy2), the controller 80 determines that the nozzle 10 has the second abnormality. In a case that the voltage difference Hy is less than the threshold value (Hy<Hy3), the controller 80 determines that the nozzle 10 has the third abnormality. Note that also in the fourth modification, the controller 80 may perform the above-described determination regarding each of the ejection of large droplet, the ejection of medium droplet and the ejection of small droplet, in a similar manner as in the above-described embodiment. In this case, the controller 80 may set the above-described "Hy1", "Hy2" and "Hy3" individually with respect to each of the ejection of large droplet, the ejection of medium droplet and the ejection of small droplet.

Further, in the above-described embodiment, although the ink is discharged (exhausted) from the nozzles 10 by the suction purge, the aspect of the present disclosure is not limited to this. For example, it is allowable to provide a pressure pump configured to pressure the ink inside the ink-jet head 4 in a channel between the ink cartridges 14 and the ink-jet head 4, etc. Further, it is allowable to perform, as a purge, a pressure purge of discharging the ink inside the ink-jet head 4 by driving the pressure pump in a state that the plurality of nozzles 10 are covered by the cap 71. Note that in this case, the cap 71 and the pressure pump correspond to a "discharging mechanism" of the present disclosure, and the pressure purge corresponds to a "discharging operation" of the present disclosure.

Alternatively, it is also allowable to perform both of the suction purge by driving the suction pump 72 and the above-described pressure purge by driving the pressure pump. Note that in this case, the suction purge and the pressure purge correspond to the "discharging operation" of the present disclosure. Further, in this case, the maintenance unit 8 and the pressure pump construct the "discharging mechanism" of the present disclosure.

Further, the aspect of the present disclosure is not limited also to the discharging of the ink from the nozzles 10 by the purge. For example, it is also allowable to drive the driving elements 20 of the ink-jet head 4 to thereby perform a flushing of discharging (exhausting) the ink from the nozzles 10. Note that in this case, the driving elements 20 correspond to the "discharging mechanism" and the flushing correspond to the "discharging operation" of the present disclosure.

Furthermore, in the above-described example, the controller 80 determines as to whether or not the nozzle 10 has the first to third abnormalities based on the signal output from the signal processing circuit 78, in accordance with the voltage change in the electrode 76 arranged in the cap 71, in a case that the ink-jet head 4 is caused to perform the inspecting driving. The aspect of the resent disclosure, however, is not limited to this.

For example, it is allowable to provide an electrode which extends in a vertical direction and which faces a space below the nozzles 10 in a state that the carriage 2 is positioned at the maintenance position, rather than providing the electrode 76. Further, it is allowable that a signal in accordance with a voltage change of the above-described electrode is output from the signal processing circuit 78 in a case that the inspecting driving is performed in the state that the carriage 2 is positioned at the maintenance position. Furthermore, it is allowable that the controller 80 determines as to whether or not the nozzle 10 has the first to third abnormalities, based on the signal.

Alternatively, for example, it is also allowable to provide an optical sensor configured to directly detect the ink ejected from the nozzle 10 in a state that the carriage 2 is positioned at a predetermined position such as the maintenance position, etc., and to output a signal in accordance with a result of the detection. Further, it is also allowable that the controller 80 determines as to whether or not the nozzle 10 has the first to third abnormalities, based on the signal output from the optical sensor.

Alternatively, for example, in a similar manner described in Japanese Patent No. 4929699, it is allowable to connect, to a plate in which a nozzle of an ink-jet head is formed, a voltage detecting circuit configured to detect a change in voltage in a case that an ink is ejected from the nozzle, and to determine as to whether or not the nozzle has the first to third abnormalities based on a signal output from the voltage detecting circuit in a case that an operation for causing the ink to be ejected from the nozzle in a state that a carriage is moved to a inspecting position is performed. The entire content of Japanese Patent No. 4929699 is incorporated herein by reference.

Alternatively, for example, in a similar manner described in Japanese Patent No. 6231759, it is allowable to configure a substrate of an ink-jet head to be provided with a temperature detecting element. The entire content of Japanese Patent No. 6231759 is incorporated herein by reference. Further, the controller 80 may apply a first apply voltage for ejecting an ink and may drive a heater, and then the controller 80 may apply a second apply voltage by which the ink is not ejected, may drive the heater and may apply the second apply voltage. Then, the controller 80 may output a signal in accordance with as to whether or not the nozzle 10 has the first to third abnormalities, based on a change in a temperature detected by the temperature detecting element during a period of time since the second apply voltage has been applied and until a predetermined time is elapsed thereafter. Further, the controller 80 may determine as to whether or not the nozzle 10 has the first to third abnormalities, based on the signal.

Still alternatively, the controller 80 may cause the printer to record a predetermined test pattern, and to determine as to whether or not the nozzle 10 has the first to third abnormalities based on a result of recording of the test pattern. In this situation, in a case that the printer is a multifunction peripheral provided with a scanner, the controller 80 may also cause the scanner to read the test pattern so as to input the result of recording of the test pattern.

Alternatively, the controller 80 may cause the user to operate the operating part 68 and/or an external apparatus connected to the printer based on the result of recording of the test pattern to thereby input the result of recording of the test pattern.

Further, in the above-described embodiment, in a case that the voltage difference H is smaller than the normal range ($H2a \leq H < H1a$, $H2b \leq H < H1b$, $H2c \leq H < H1c$), the controller 80 performs the determination as to whether or not the nozzle 10 has the second abnormality or the third abnormality discriminatingly based on whether or not the voltage difference H is not less than the threshold value (H3a, H3b, H3c). The aspect of the present disclosure, however, is not limited to this. For example, in a case that there is no need to determine discriminatingly as to whether or not the nozzle 10 has the ejection shortage abnormality of the non-ejection abnormality and that the voltage difference H is smaller than the normal range, the controller 80 may always determine that the nozzle 10 has the second abnormality. Note that in this case, the second abnormality is, for example, either one of the ejection shortage abnormality and the non-ejection abnormality.

Furthermore, in the above-described embodiment, the ink-jet head 4 is configured to eject, from the nozzle 10, three kinds of ink droplets which are the large droplet, the medium droplet and the small droplet. The aspect of the present disclosure, however, is not limited to this. The ink-jet head 4 may be configured to eject two kinds or not less than four kinds of ink droplets. In this case, one of arbitrary two kinds of ink droplets of the two kinds of ink droplets or not less than the four kinds of ink droplets corresponds to a "first liquid droplet" of the present disclosure, and the other of the arbitrary two kinds of ink droplets of the two kinds of ink droplets or not less than the four kinds of ink droplets corresponds to a "second liquid droplet" of the present disclosure. Alternatively, it is also allowable to provide such a configuration that only one kind of ink droplet can be ejected from the nozzle 10.

Moreover, in the above-described example, the controller 80 determines as to whether or not the nozzle 10 has the first to third abnormalities by performing the inspecting driving regarding all of the nozzles 10 of the ink-jet head 4. The aspect of the present disclosure, however, is not limited to this. For example, the controller 80 may perform the inspecting driving regarding only a part of the nozzles 10 of the ink jet head 4, for example, every other nozzles 10 in each of the nozzle rows 9 so as to determine as to whether or not the nozzle 10 has the abnormality. Further, regarding nozzles 10 which is included in the nozzles 10 and different from the part of the nozzles 10, the controller 80 may presume as to whether or not the nozzles 10 have the abnormality, based on the result of determination regarding the part of the nozzles 10.

Furthermore, in the above-described embodiment, the controller 80 defines or considers the first abnormality as being either one of the spraying abnormality and the deflecting abnormality; in a case that a certain nozzle 10, of the nozzles 10, which is determined by the controller 80 to have the first abnormality in each, of the plurality of times of the determination, which is executed first after one of the continuous first predetermined number of times of the discharging processing, the controller 80 determines that the certain nozzle 10 has the flaw abnormality. The aspect of the present disclosure, however, is not limited to this. The spraying abnormality and the deflecting abnormality are highly likely to occur in a case that the nozzle 10 has the flaw abnormality. Accordingly, it is allowable to define or consider the first abnormality as the flaw abnormality.

Moreover, in the above-described embodiment, although the first abnormality is defined as being either one of the spraying abnormality, the deflecting abnormality and the flaw abnormality, the second abnormality is defined as being the ejection shortage abnormality, the third abnormality is defined as being the non-ejection abnormality, it is allowable that each of the first to third abnormality includes an abnormality which is different from the spraying abnormality, the deflecting abnormality, the flaw abnormality, the ejection shortage abnormality and the non-ejection abnormality.

Further, in the above-described embodiment, the explanation has been made regarding the example wherein the present disclosure is applied to a printer provided with a so-called serial head which ejects the ink(s) from the plurality of nozzles while moving in the scanning direction together with the carriage. The aspect of the present disclosure, however, is not limited to this. The present disclosure is applicable, for example, also to a printer provided with a so-called line head which extends in the scanning direction over the entire length of a recoding paper sheet, and having a plurality of nozzles aligned in the scanning direction.

Furthermore, in the foregoing description, the explanation has been given about the example wherein the present disclosure is applied to the printer which ejects the ink(s) from the nozzles so as to perform recording on the recording paper sheet P. The aspect of the present disclosure, however, is not limited to this. The present disclosure may be applied also to a printer which records an image on a recording medium different from the recording paper sheet, such as a T-shirt, a sheet for outdoor advertisement, a case of a mobile terminal such as a smartphone, etc., a corrugated cardboard, a resin member, etc. Moreover, the present disclosure may be applied also to a liquid droplet ejecting apparatus which ejects a liquid droplet different from the ink droplet, such as a liquid droplet of a liquified resin or metal, etc.

What is claimed is:

1. A liquid droplet ejecting apparatus comprising:

a head including a nozzle and configured to perform ejection of a liquid droplet from the nozzle;

a signal outputting part including an electrode and configured to output a signal indicating a magnitude of an electric change in the electrode; and a controller, wherein the controller is configured to execute a determination as to whether or not the nozzle is normal based on the signal output from the signal outputting part in a case that the controller drives the head so as to eject the liquid droplet from the nozzle toward the electrode, and in a case that the controller executes the determination as to whether or not the nozzle is normal, the controller is configured to:

determine that the nozzle is normal in a case that the magnitude of the electric change indicated by the signal output from the signal outputting part is within a normal range, and determine that the nozzle has a first abnormality in a case that the magnitude of the electric change indicated by the signal output from the signal outputting part is greater than the normal range.

2. The liquid droplet ejecting apparatus according to claim 1, wherein in the case that the controller executes the determination as to whether or not the nozzle is normal, the controller is configured to determine that the nozzle has a second abnormality, which is different from the first abnormality, in a case that the magnitude of the electric change indicated by the signal output from the signal outputting part is smaller than the normal range.

3. The liquid droplet ejecting apparatus according to claim 1, wherein in the case that the controller executes the determination as to whether or not the nozzle is normal, the controller is configured to:

determine that the nozzle has a second abnormality, which is different from the first abnormality, in a case that the magnitude of the electric change indicated by the signal output from the signal outputting part is smaller than the normal range and is not less than a threshold value; and determine that the nozzle has a third abnormality, which is different from both of the first abnormality and the second abnormality, in a case that the magnitude of the electric change indicated by the signal output from the signal outputting part is less than the threshold value.

4. The liquid droplet ejecting apparatus according to claim 1, wherein the first abnormality includes a spraying abnormality in which the liquid droplets spray.

5. The liquid droplet ejecting apparatus according to claim 1, wherein the first abnormality includes a deflecting abnormality in which an ejecting direction of the liquid droplet deflects.

6. The liquid droplet ejecting apparatus according to claim 1, wherein the first abnormality includes a flaw abnormality in which the nozzle has a flaw.

7. The liquid droplet ejecting apparatus according to claim 6, further comprising a discharging mechanism configured to perform a discharging operation of discharging the liquid from the nozzle, wherein the controller is configured to:

execute the determination as to whether or not the nozzle is normal after causing the discharging mechanism to perform the discharging operation; and determine that the nozzle has the flaw abnormality in a case that the nozzle is determined to have the first abnormality in each of a plurality of times of the determination as to whether or not the nozzle is normal which is executed first after one of a continuous first predetermined number of times of the discharging operation.

8. The liquid droplet ejecting apparatus according to claim 7, further comprising a memory, wherein the controller is configured to cause the memory to store the nozzle determined to have the flaw abnormality as a non-recoverable nozzle which is not recovered by a recovering operation.

9. The liquid droplet ejecting apparatus according to claim 2, further comprising:

a discharging mechanism configured to perform a discharging operation of discharging the liquid from the nozzle; and a memory, wherein the controller is configured to:

execute the determination as to whether or not the nozzle is normal after causing the discharging mechanism to perform the discharging operation;

cause the memory to store, as a non-recoverable nozzle which is not recovered by the discharging operation, the nozzle determined to have the first abnormality in each of a plurality of times of the determination as to whether or not the nozzle is normal which is executed first after one of a continuous first number of times of the discharging operation; and cause the memory to store, as the non-recoverable nozzle, the nozzle determined to have the second abnormality in each of a plurality of times of the determination as to whether or not the nozzle is normal which is executed first after one of a continuous second number of times of the discharging operation, the second number of times being greater than the first number of times.

10. The liquid droplet ejecting apparatus according to claim 3, further comprising:

a discharging mechanism configured to perform a discharging operation of discharging the liquid from the nozzle; and a memory, wherein the controller is configured to:

execute the determination as to whether or not the nozzle is normal after causing the discharging mechanism to perform the discharging operation;

cause the memory to store, as a non-recoverable nozzle which is not recovered by the discharging operation, the nozzle determined to have the first abnormality in each of a plurality of times of the determination as to whether or not the nozzle is normal which is executed first after one of a continuous first number of times of the discharging operation;

cause the memory to store, as the non-recoverable nozzle, the nozzle determined to have the second abnormality in each of a plurality of times of the determination as to whether or not the nozzle is normal which is executed first after one of a continuous second number of times of the discharging operation, the second number of times being greater than the first number of times; and cause the memory to store, as the non-recoverable nozzle, the nozzle determined to have the third abnormality in each of a plurality of times of the determination as to whether or not the nozzle is normal which is executed first after one of a continuous third number of times of the discharging operation, the third number of times being greater than the first number of times and smaller than the second number of times.

11. The liquid droplet ejecting apparatus according to claim 9, wherein the head includes a plurality of nozzles; and the controller is configured to cause, after the determination as to whether or not the nozzle is normal, the discharging mechanism to perform the discharging operation in a case that at least one of a first condition, a second condition and a third condition is satisfied, the first condition being a condition that the number of the plurality of nozzles, each of which is determined to have the first abnormality and each of which is not stored in the memory as the non-recoverable nozzle is not less than a first number, the second condition being a condition that the number of the plurality of nozzles, each of which is determined to have the second abnormality and each of which is not stored in the memory as the non-recoverable nozzle is not less than a second number, and the third condition being a condition that the number of the plurality of nozzles, each of which is determined to have either one of the first abnormality and the second abnormality and each of which is not stored in the memory as the non-recoverable nozzle is not less than a third number.

12. The liquid droplet ejecting apparatus according to claim 7, wherein the discharging mechanism includes:

a cap configured to cover the nozzle; and a pump configured to apply a pressure to liquid inside the nozzle, and the controller is configured to cause the discharging mechanism to perform a purge, as the discharging operation, of driving the pump in a state that the nozzle is covered by the cap to thereby cause the liquid to be discharged from the nozzle to the cap.

13. The liquid droplet ejecting apparatus according to claim 8, further comprising a notifying part, wherein the nozzle includes a plurality of nozzles, and the controller is configured to execute a notification of causing the notifying part to perform a notification for urging exchange of the head in a case that the number of the non-recoverable nozzle, of the plurality nozzles, reaches a fourth number.

14. The liquid droplet ejecting apparatus according to claim 13, further comprising a displaying part as the notifying part, wherein the controller is configured, in the notification, to cause the displaying part to display an object for urging the exchange of the head to perform the notification.

15. The liquid droplet ejecting apparatus according to claim 1, wherein the head is configured to perform a first ejection which is the ejection of the liquid droplet from the nozzle so as to form a first dot, and to perform a second ejection which is the ejection of the liquid droplet from the nozzle so as to form a second dot formed of an amount, of the liquid, which is different from an amount of the liquid forming the first dot, and in the case that the controller performs the determination as to whether or not the nozzle is normal, the controller is configured to:

determine as to whether or not the nozzle is normal regarding the first ejection of the liquid droplet based on the signal output from the signal outputting part in a case that the controller drives the head so as to perform the first ejection; and determine as to whether or not the nozzle is normal regarding the second ejection of the liquid droplet based on the signal output from the signal outputting part in a case that the controller drives the head so as to perform the second ejection.

16. A liquid droplet ejecting apparatus comprising:

a nozzle configured to eject a liquid droplet;

a signal outputting part configured to output a signal in accordance with a result of an inspecting driving of inspecting as to whether or not the nozzle has an abnormality; and a controller, wherein the controller is configured to:

determine that the nozzle is normal in a case that a value of the signal output from the signal outputting part is within a normal range;

determine that the nozzle has a first abnormality in a case that the value of the signal is greater than the normal range; and determine that the nozzle has a second abnormality, which is different from the first abnormality, in a case that the value of the signal is smaller than the normal range.

* * * * *